United States Patent
Wang et al.

(10) Patent No.: US 11,557,292 B1
(45) Date of Patent: Jan. 17, 2023

(54) SPEECH COMMAND VERIFICATION

(71) Applicant: Amazon Technologies, Inc., Seattle, WA (US)

(72) Inventors: Joseph Wang, Concord, MA (US); Michael J Rodehorst, Belmont, MA (US); Rajath Kumar Mysore Pradeep Kumar, Cambridge, MA (US)

(73) Assignee: Amazon Technologies, Inc., Seattle, WA (US)

( * ) Notice: Subject to any disclaimer, the term of this patent is extended or adjusted under 35 U.S.C. 154(b) by 111 days.

(21) Appl. No.: 17/116,129

(22) Filed: Dec. 9, 2020

Related U.S. Application Data

(60) Provisional application No. 63/094,683, filed on Oct. 21, 2020, provisional application No. 63/094,687, filed on Oct. 21, 2020.

(51) Int. Cl.

| | | |
|---|---|---|
| *G10L 15/22* | (2006.01) | |
| *G10L 15/02* | (2006.01) | |
| *G10L 15/16* | (2006.01) | |
| *G06N 3/08* | (2006.01) | |
| *G10L 15/05* | (2013.01) | |
| *G10L 15/08* | (2006.01) | |

(52) U.S. Cl.
CPC .............. *G10L 15/22* (2013.01); *G06N 3/08* (2013.01); *G10L 15/02* (2013.01); *G10L 15/05* (2013.01); *G10L 15/16* (2013.01); *G10L 2015/088* (2013.01); *G10L 2015/223* (2013.01)

(58) Field of Classification Search
CPC ......... G10L 15/02; G10L 15/05; G10L 15/16; G10L 15/22; G06N 3/08
USPC ........................................................ 704/232
See application file for complete search history.

(56) References Cited

U.S. PATENT DOCUMENTS

| | | | | |
|---|---|---|---|---|
| 10,497,084 | B2 * | 12/2019 | Appu | G06N 3/0445 |
| 10,515,623 | B1 * | 12/2019 | Grizzel | G06F 3/012 |
| 10,692,485 | B1 * | 6/2020 | Grizzel | G10L 15/22 |
| 10,692,489 | B1 * | 6/2020 | Grizzel | G10L 15/18 |
| 10,733,987 | B1 * | 8/2020 | Govender | G10L 17/06 |
| 11,037,548 | B2 * | 6/2021 | Kim | G10L 15/063 |
| 11,043,218 | B1 * | 6/2021 | Sun | G10L 15/22 |
| 11,049,213 | B2 * | 6/2021 | Appu | G06T 1/20 |
| 11,100,923 | B2 * | 8/2021 | Fainberg | G10L 15/14 |
| 11,107,189 | B2 * | 8/2021 | Wang | G06K 9/6267 |
| 11,132,990 | B1 * | 9/2021 | Sun | G10L 25/21 |
| 11,170,776 | B1 * | 11/2021 | Whalin | G10L 15/30 |
| 11,205,420 | B1 * | 12/2021 | Fu | G06N 3/0445 |
| 11,250,857 | B1 * | 2/2022 | Kim | G06F 3/167 |
| 11,322,150 | B2 * | 5/2022 | Nadig | G10L 15/146 |

\* cited by examiner

*Primary Examiner* — Susan I McFadden
(74) *Attorney, Agent, or Firm* — Pierce Atwood LLP

(57) ABSTRACT

A system and method performs speech command verification to determine if audio data includes a representation of a speech command. A first neural network may process portions of the audio data before and after a representation of a wake trigger in the audio data. A second neural network may process the audio data using a recurrent neural network to determine if the audio data includes a representation of a wake trigger.

20 Claims, 15 Drawing Sheets

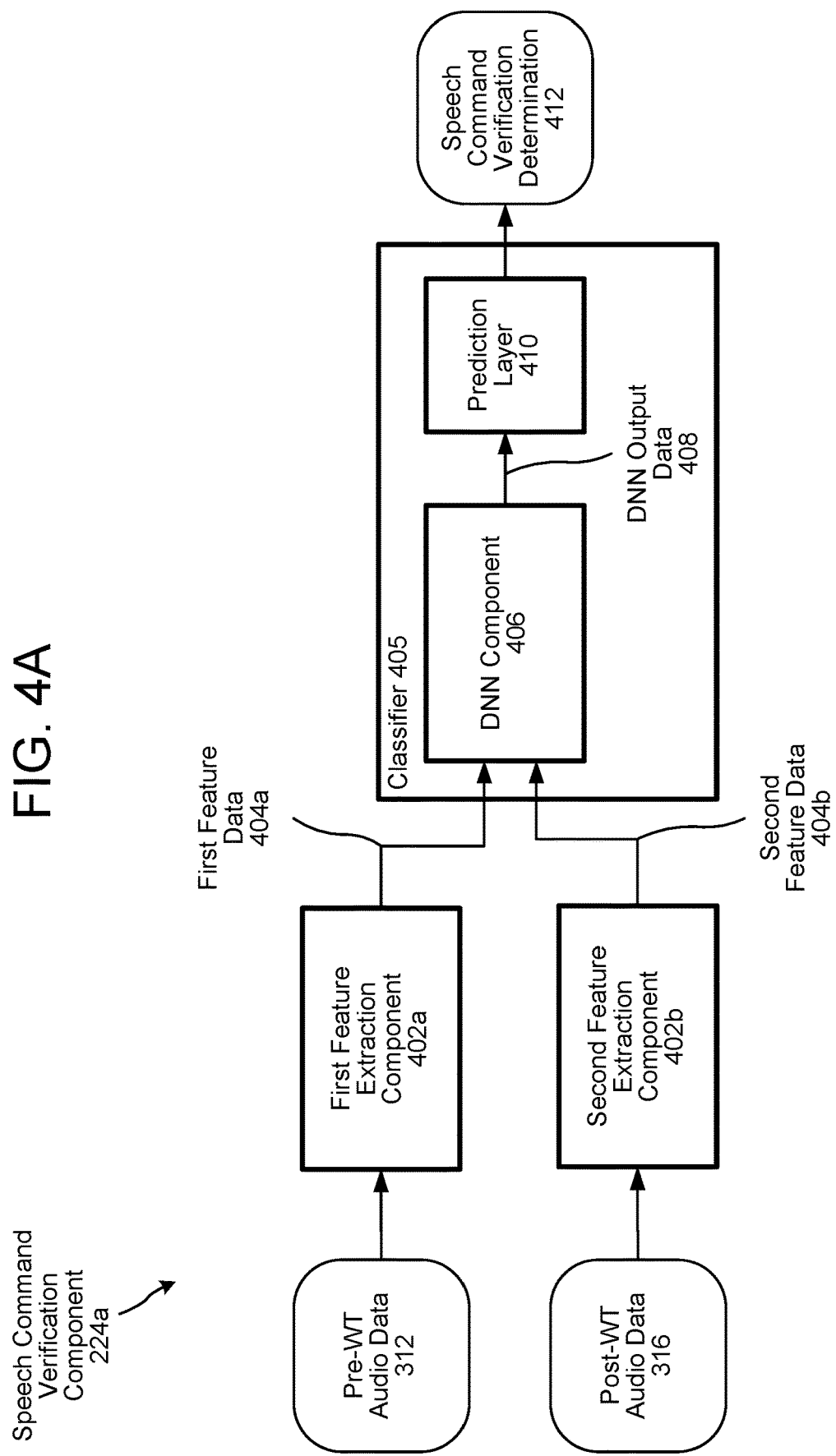

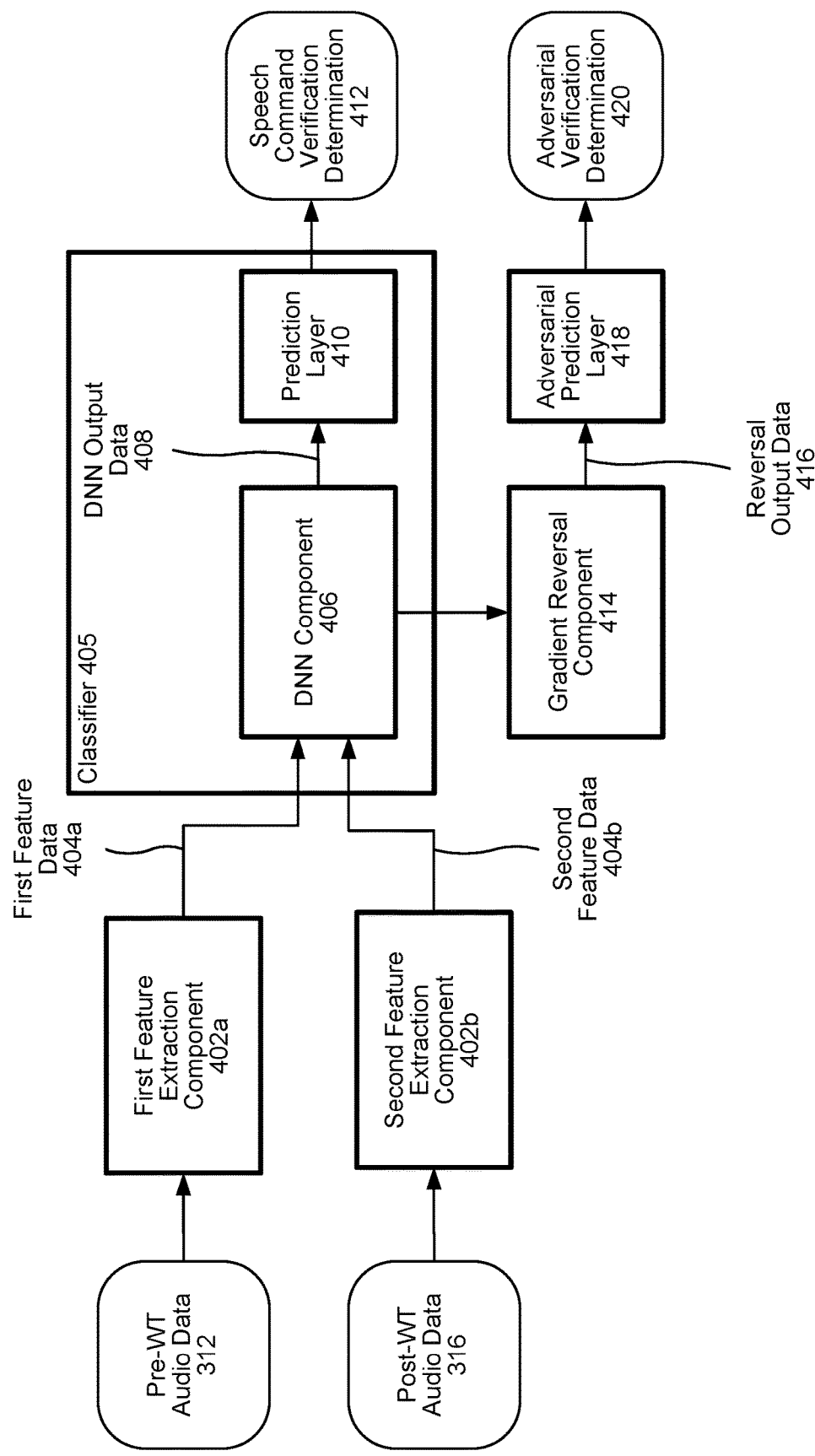

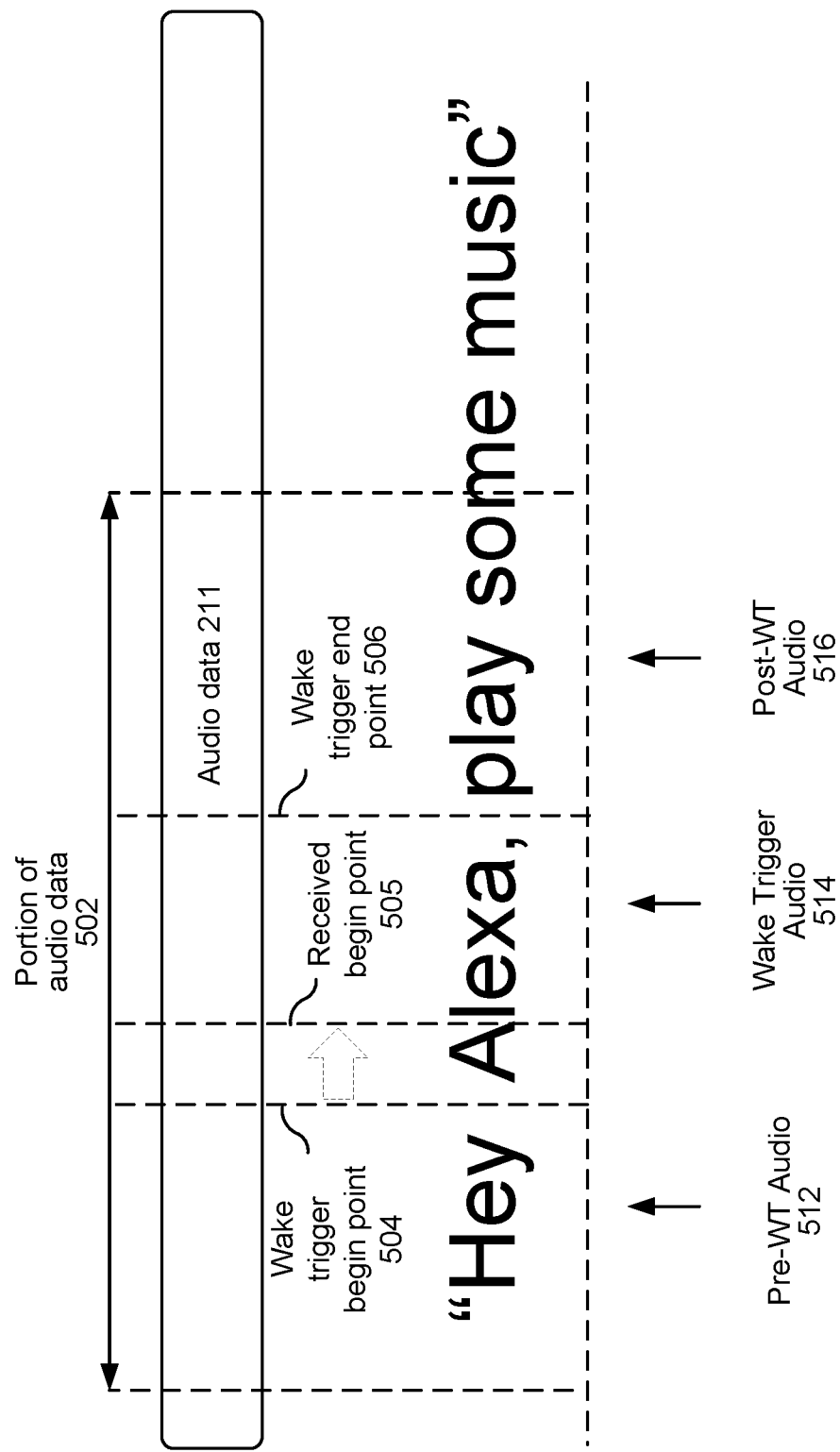

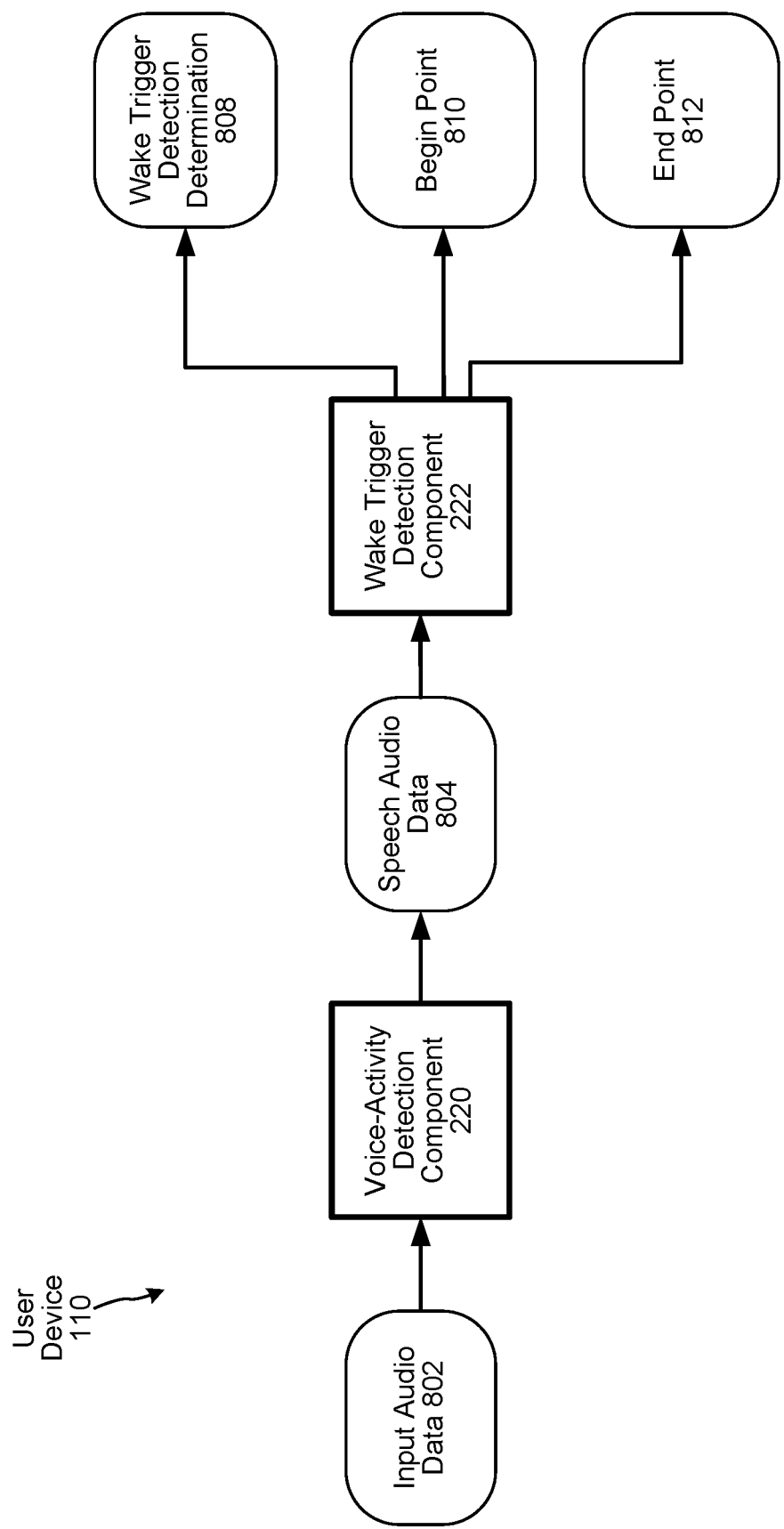

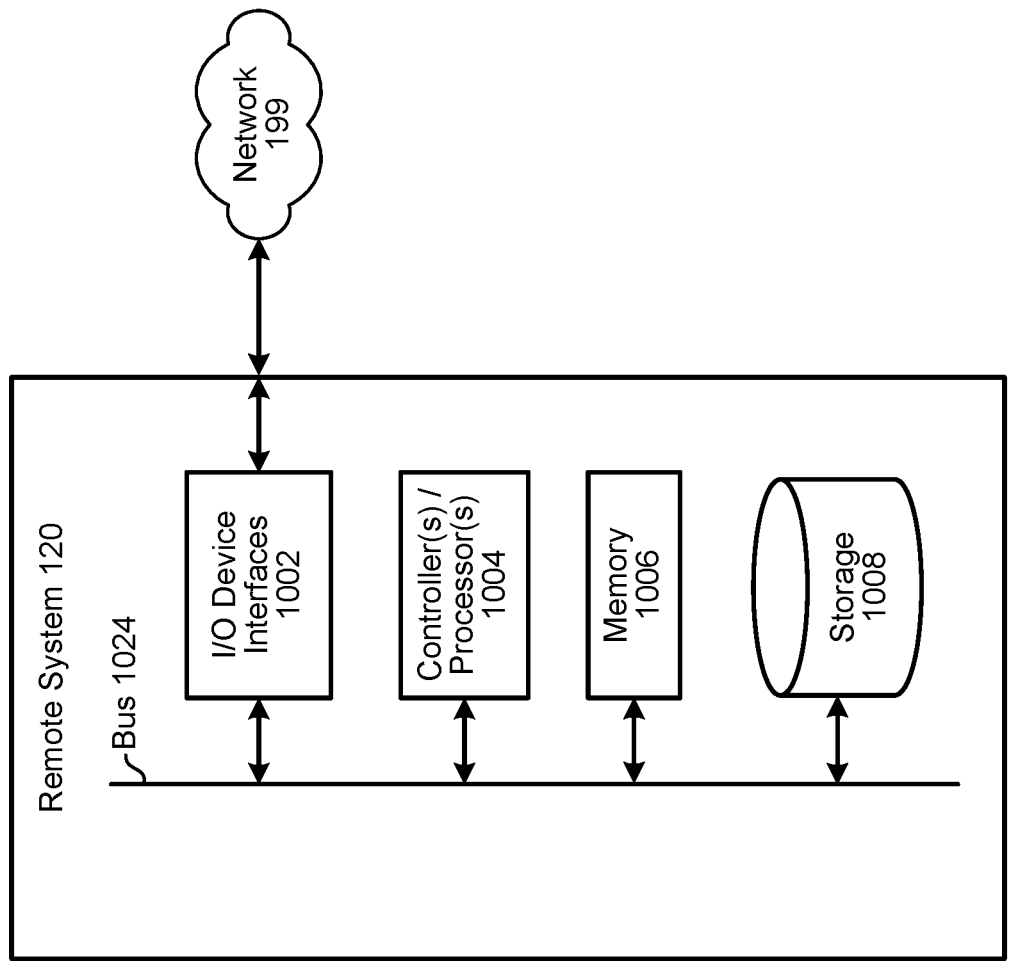

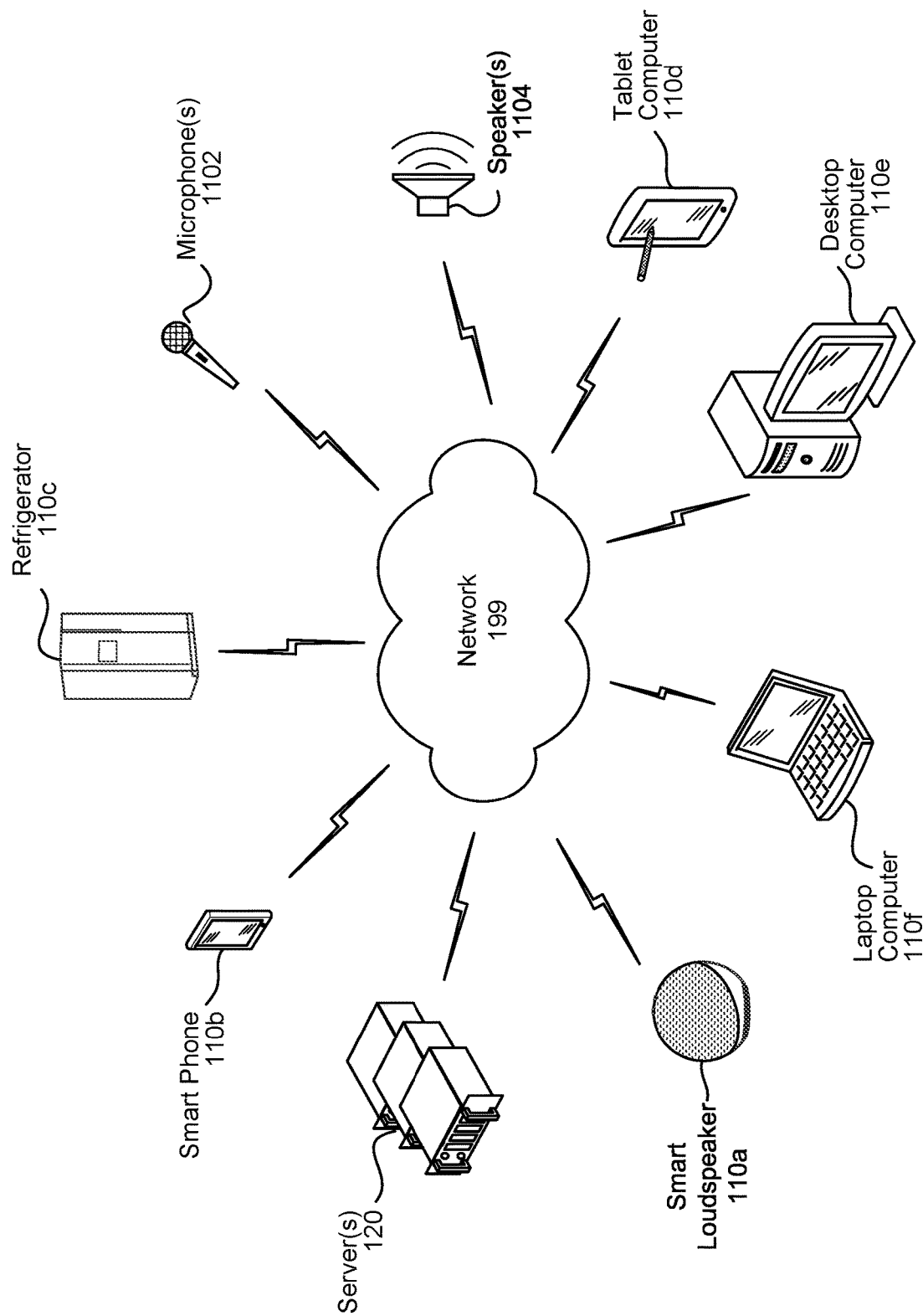

SPEECH COMMAND VERIFICATION

CROSS REFERENCE TO RELATED APPLICATIONS

This application claims the benefit of priority of U.S. Provisional Patent Application No. 63/094,683, filed Oct. 21, 2020, and entitled "Device Directed Verification," in the name of Joseph Wang, and U.S. Provisional Patent Application No. 63/094,687, filed Oct. 21, 2020, and entitled "Wakeword Verification Using a Neural Network," in the name of Rajath Kumar Mysore Pradeep Kumar. The above provisional applications are hereby incorporated by reference in their entirety.

BACKGROUND

Speech-recognition systems allow humans to interact with computing devices using their voices. These systems use techniques to identify words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is referred to herein as speech processing. Speech processing may involve converting a user's speech into text data which may then be provided to various text-based software applications. Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIGS. 4A and 4B illustrate components for verification of a speech command in accordance with embodiments of the present disclosure.

FIG. 5 illustrates a second speech command in accordance with embodiments of the present disclosure.

FIG. 8 illustrates components for wake trigger detection in accordance with embodiments of the present disclosure.

FIG. 10 illustrates components of a remote system in accordance with embodiments of the present disclosure.

FIG. 11 illustrates a computer network for use with embodiments of the present disclosure.

DETAILED DESCRIPTION

Figure 1:
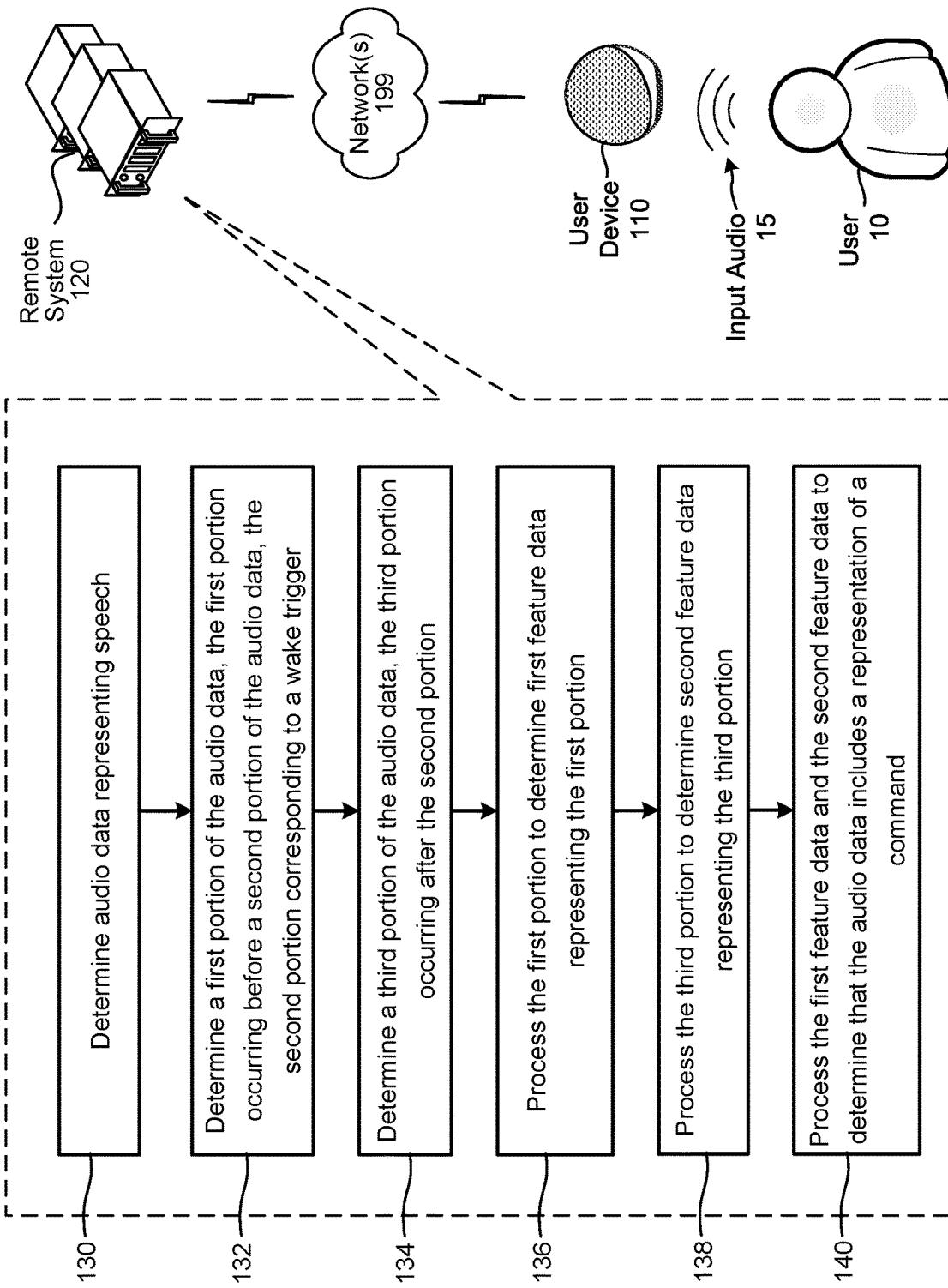
FIG. 1 illustrates a system for verification of a speech command in accordance with embodiments of the present disclosure.

Automatic speech recognition (ASR) is a field of computer science, artificial intelligence, and linguistics involving transforming audio data associated with speech into text representative of that speech. Natural language understanding (NLU) is a field of computer science, artificial intelligence, and linguistics concerned with enabling computers to derive meaning from input data representing natural language (e.g., text data and/or audio data). ASR and NLU are often used together as part of a speech processing system.

A user device, such as a cellular telephone, tablet computer, or laptop computer, having one or more microphones may be configured to capture sounds including speech from a user and convert those sounds into an audio signal; the user device may then perform speech processing. In other embodiments, a distributed computing environment may be used to perform the speech processing. An example distributed environment may include the user device and a remote device; the user device may send audio data representing the speech to the remote device, which then performs some or all of the speech processing. A command represented in the audio data may then be executed by a combination of the remote system and/or the user device. Text-to-speech (TTS) processing may be used to generate synthetic speech responsive to the command that may be output by the user device.

The user device and/or remote system may be configured to further process audio data upon determining that the audio data is system directed; e.g., a user may speak a particular word or phrase or create a particular nonspeech sound—referred to collectively herein as a "wake trigger"—that indicates that the user device should direct (to, a remote system) and/or process associated audio data in expectation of the user speaking further words and/or other sounds representing a command. As the terms are used herein, system-directed audio data includes a representation of speech that a user intends to direct to a system, such as a speech-processing system. Non-system-directed audio data (and/or corresponding audio) does not include a representation of speech or includes a representation of speech that a user does not intend to be directed to a system such as a speech-processing system. For example, the speech "Alexa, what is the weather today?" may be system-directed speech, while the speech, "Alexa is meeting us at the mall," may be non-system directed speech.

A subset of wake triggers that correspond to words or phrases may be referred to as "wakewords." Some components of the user device, such as a voice-activity detection (VAD) component (discussed in greater detail below) may continually listen for speech and/or nonspeech sounds; upon detection of speech and/or nonspeech sounds, the VAD component may cause the processing of the audio data using other components, such as a wake trigger-detection component (also discussed in greater detail below). The wake trigger may thus represent an indication for the user device and/or remote system to perform further processing. For example, a system may be configured to detect a wake trigger or other input (such as a button press) and then process any subsequent audio following the wake trigger or other input (and, in some embodiments, some amount of pre-wake trigger audio) to detect any commands in the subsequent audio. As an example, a wake trigger may include a name by which a user refers to a user device, a name of a different device, a name of an assistant, a name of a skill, a hand clap, and/or a whistle. Thus, if a wake trigger is "Alexa," a user may command a user device to play music by saying "Alexa, play some music now." If the wake trigger is a hand clap, the user may command the user device to turn on the lights by performing/saying the sequences of sounds and words, "<clap><clap> Turn on the lights." The user device may continually receive and process audio to detect the wake trigger. Additionally or alternatively, the user device may send audio data representing the speech to the remote device to perform speech processing on that audio to determine the command for execution. Commands may include performing actions, outputting media such as music or videos, obtaining and/or providing information, and/or initiating Internet-based services on behalf of the user.

The remote system may further process the audio data to verify that the audio data includes a representation of a speech command to confirm that the audio data is system directed. The remote system may possess more processing resources compared to the user device (e.g., a larger, faster neural network) that may more accurately determine if the audio data includes the representation of the speech command. In some embodiments, a user of the user device may define a user-specific wake trigger. In other embodiments, the user device may attempt to identify the begin and end points of the wake trigger in the audio data and send data corresponding to the begin and end points to the remote device.

Embodiments of the present disclosure thus include systems and methods for verifying that audio data is system directed by, for example, determining that the audio data includes a representation of a speech command. In some embodiments, neural-network components process portions of the audio data occurring before and after a portion that includes the representation of the wake trigger to determine if those portions correspond to a speech command. In other embodiments, neural-network components may instead or in addition process portions of the audio data that may correspond to a first portion before a second portion corresponding to the wake trigger, the second portion corresponding to the wake trigger, and/or a third portion after the second portion to verify that the audio data includes the representation of the wake trigger even if data representing begin and end points of the second portion do not correctly identify the position of the representation of the wake trigger.

FIG. 1 illustrates a user device 110 and remote system 120 for verifying that audio data corresponding to a speech command is system directed. Although the figures and discussion illustrate certain operational steps of the system in a particular order, the steps described may be performed in a different order (as well as certain steps removed or added) without departing from the intent of the disclosure. A user device 110 local to a user 10 may communicate across the network 199 with a remote system 120. The remote system 120 may be a server device in communication with the user device 110 via the Internet or a local hub device in communication with the user device 110 via a local network. The user device 110 may receive input audio 15 from a user 10 and may perform, using a neural network, wake trigger detection using the input audio 15. The user device 110 may further determine, using the same or different neural network, a begin point and an end point of the wake trigger. If a wake trigger is detected, the user device 110 may further send audio data representing the input audio 15 to the remote system 120 via the network 199. The user device 110 send indications of the begin point and end point to the remote system 120. The remote system 120 may verify detection of the wake trigger using the begin point and end point and may perform additional speech processing (e.g., ASR and NLU), using a language-specific speech-processing component, on the audio data to determine output data responsive to an utterance represented in the audio data. The user device 110 may receive the output data from the remote system 120 and output content corresponding to the output data.

In some embodiments, with reference to FIG. 1, the user device 110 may receive, from at least one microphone, audio data representing speech. The audio data may include samples; each sample may be a number that represents a property, such as an amplitude, of audio received by a microphone of the user device 110. The number of samples per unit of audio (e.g., per second of audio) may be determined by a sampling rate, such as 44,000 samples per second (e.g., 44 kHz). The samples may be grouped in audio frames; each frame may include, for example, 440 samples (corresponding to 10 milliseconds of audio).

The user device 110 may preprocess the audio data received from the microphone prior to it being further processed by one or more other components, as described herein. This pre-processing may include transforming the audio data to frequency domain audio data using, for example, a Fourier transform; transforming the audio data into a Mel-frequency and/or Mel-cepstrum representation; and/or computing log filterbank energies (LFBEs) corresponding to the audio data. In some embodiments, the frequency-domain audio data may be split into a number of frequency sub-ranges, referred to herein as frequency bins. The LFBE representations may thus correspond to a number of frequency bins, such as 64 frequency bins, and may correspond to a period of time of the audio data received from a microphone, such as 25 milliseconds. In various embodiments, the user device 110 and/or remote system 120 may thus determine (130) audio data representing speech, which may include the LFBE representations.

The user device 110 and/or remote system 120 may further determine (132) a first portion of the audio data, the first portion occurring before a second portion of the audio data and may determine (134) a third portion of the audio data, the third portion occurring after the second portion. The second portion of the audio data may correspond to the wake trigger. The first portion thus corresponds to audio occurring before the representation of the wake trigger, which may include first speech and/or first sounds, and the second portion may correspond to audio occurring after the representation of the wake trigger, which may include second speech and/or second sounds. The first portion and the second portion may each correspond to a fixed duration of time, for example 0.5 seconds. The second portion may correspond to 1.0 seconds. In some embodiments, the durations of the first, second, and/or third portions may vary based on, for example, a number of words and/or sounds in the wake trigger, a type of the environment of the user device 110, and/or a type of the command represented in the audio data.

The user device 110 and/or remote system 120 may process (136) (using e.g., a first component such as the first feature-extraction component 402a of FIG. 4A) the first portion to determine first feature data representing the first portion and may process (138) (using, e.g., a second component, such as the second feature-extraction component 402b) the third portion to determine second feature data representing the third portion. As described herein, the first component may include one or more first convolutional neural network (CNN) layers, and the second component may include one or more second CNN layers. The first and second feature data may thus correspond to feature data uniquely identifying particular words and/or sounds represented in the first and third portions. In other words, the first and second components may encode the words and/or sounds into unique points in an embedding space.

The user device 110 and/or remote system 120 may then process (140) (using, e.g., a third component, such as the classifier 405) the first feature data and the second feature data to determine that the audio data includes a representation of a command and is thus system-directed. The third component may include one or more dense neural network (DNN) layers, in which each node in the DNN is connected to two or more (or, in some embodiments, all) nodes in a preceding layer or layers. In particular, the third component does not process the second portion that corresponds to the wake trigger. Thus, if a user 10 of a user device 110 defines a user-specific wakeword, the first, second, and third components may verify that the audio data includes a representation of a speech command in a manner agnostic to the particular wakeword used.

In other embodiments, a wakeword trigger-detector of the user device 110 may attempt to determine begin and end points corresponding to the wakeword. A wake trigger-verification component may then use the determined begin and end points to identify a portion of the audio data that includes the representation of the wakeword. The user device 110 may, however, incorrectly identify the begin and/or end points such that the portion of the audio data defined by the being and end points includes only a portion of the representation of the wake trigger and/or other words and/or sounds unrelated to the wake trigger. In these embodiments, a feature-extraction component of the user device 110 and/or remote system 120 processes the audio data to determine first feature data, and a recurrent neural-neural network (RNN) component processes the first feature data to determine second feature data. The second feature data, being determined by the RNN component, may correspond to a greater period of time of the audio data than that of the first feature data; in some embodiments, the second feature data corresponds to 2 seconds of audio data (e.g., 0.5 seconds of pre-wake trigger audio data, 1.0 seconds of wake trigger audio data, and 0.5 seconds of post-wake trigger audio data). An attention component may then process the second feature data to determine attended data. The attention component may be trained to process portions of the audio data corresponding to the wake trigger with greater neural-network weights (e.g., greater "attention") and to process portions of the audio data that do not correspond to the wake trigger with lesser neural-network weights (e.g., lesser "attention"). A DNN component may then process the attended data to verify that the audio data includes a representation of the wakeword. The attention component and/or DNN component may further determine begin and/or end points corresponding to the wake trigger.

Some components described herein include neural networks to process audio data. A neural network is a computer program that includes a plurality of nodes that process an input and produce an output in accordance with one or more weights. The neural network may be trained using training data, as described in greater detail below. A components may use a convolutional neural network (CNN) to process data representing speech, which may include convolution functions, as explained in greater detail below. A components may alternatively or further include a deep neural network (DNN), which may include one or more hidden layers. A CNN and a DNN are examples of a "feedforward" neural network in that, while each node in a layer of the network may be connected to each and every node in a preceding or subsequent layer (e.g., a "fully connected" neural network), the feedforward neural network does not include any connections that loop back from a node in a layer to a previous layer. A neural network that includes such "recurrent" connections is called a recurrent neural network (RNN).

The neural network(s) described herein may receive, as input, a "window" of audio data; this window may include a number of units of audio data, such as frames of audio data, which represent a fixed length of time of received audio. For example, a frame of audio data may represent 10 milliseconds of received audio. The frame of audio data may be a time-domain representation of the magnitude and phase of the received audio. The frame of audio data may instead be or include a representation of processed received audio, which may be, for example, a frequency-domain representation of the received audio, a spectrogram (such as a Mel-cestrum), and/or an LFBE of the received audio. The window may include a plurality of frames, such as 80 frames, and may thus correspond to a certain duration of received audio, such as 800 milliseconds.

The neural network may receive and process overlapping windows of audio data; for example, the neural network may receive and process an 80-frame window of audio data every 1, 2, or 5 frames. That is, if the neural network processes a new window every frame, a first window includes frames 1-80, a second window includes frames 2-81, and so on.

The neural network(s) may include a plurality of layers of partially or fully connected nodes that each process the window of audio data in accordance with one or more trained weights. The neural network may further include one or more output layers, such as softmax or sigmoid layers, which determine one or more outputs of the neural network. A softmax layer may receive outputs from previous layers of the neural network and may normalize the outputs such that they lie on a probability distribution between two known values, such as 0 and 1, and also such that the values of the probability distribution add up to a known sum, such as 1. The outputs of the softmax layer may then be compared to a threshold value, such as 0.8, to determine a yes-or-no decision, such as if audio data represents a wake trigger or if a point in time represents a beginpoint or endpoint. A sigmoid layer may apply a sigmoid function to layers of the neural network; a sigmoid function modifies a value of an output such that values that lie in the middle of a range (e.g., values near 0.5 for a range of 0.0-1.0) increase or decrease to lie closer to the ends of the range. Such a sigmoid function may be used to more accurately make a yes-or-no decision, such as verification of the speech command.

Figure 2:
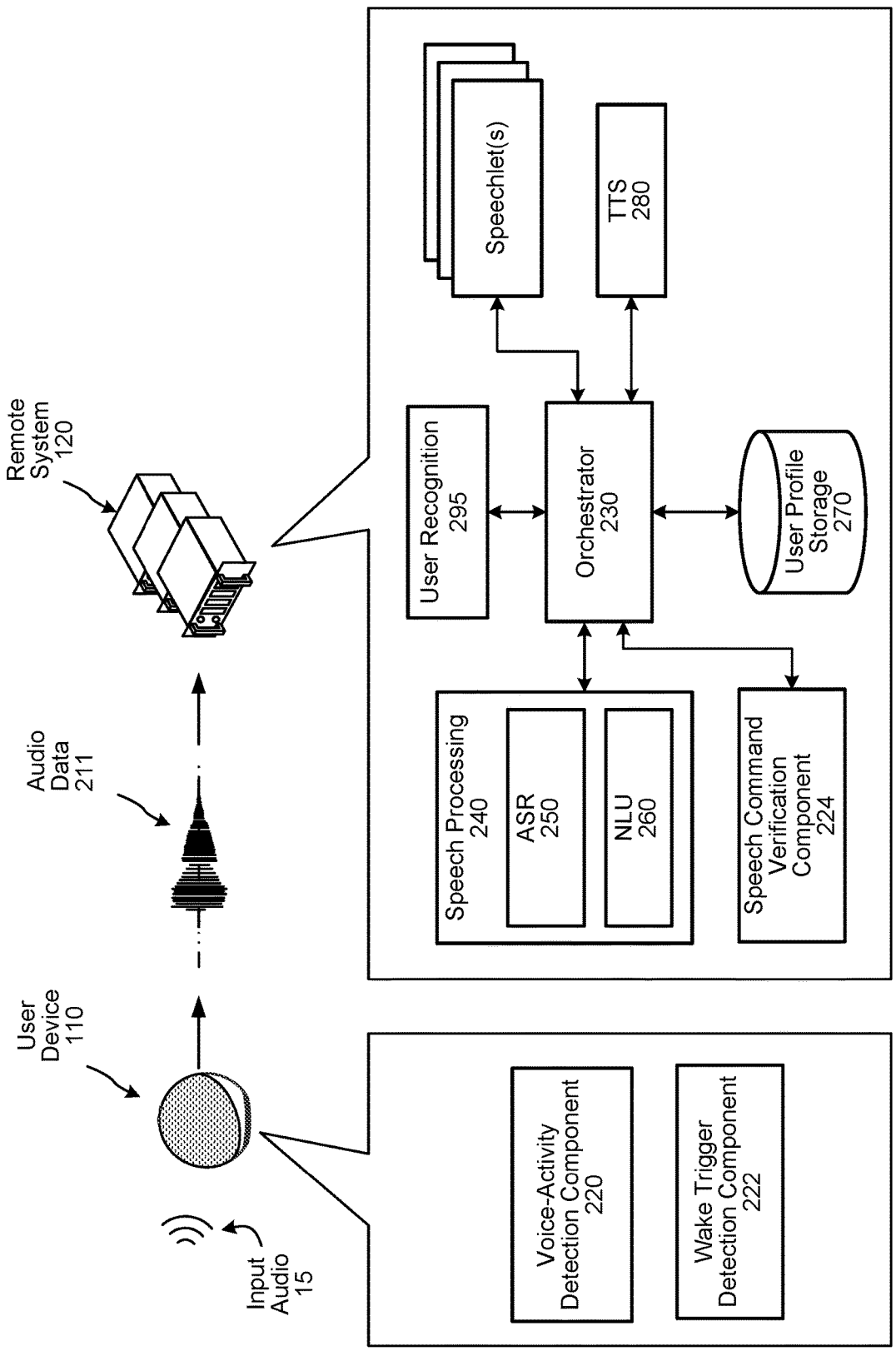
FIG. 2 illustrates components of a system for verification of a speech command and speech processing in accordance with embodiments of the present disclosure.

Referring to FIG. 2, the user device 110 may receive input audio 15 using an audio capture component, such as a microphone or array of microphones. Before performing wake trigger detection (e.g., activating one or more wake trigger-detection components 222), the user device 110 may use various techniques to first determine whether the first audio data includes speech and/or particular sounds. For example, the user device 110 may use a voice activity detection (VAD) component 220 to apply VAD techniques, which may determine whether speech and/or particular sounds are present in the first audio data based on various quantitative aspects of the first audio data, such as the spectral slope between one or more frames of the first audio data, the energy levels of the first audio data in one or more spectral bands the signal-to-noise ratios of the first audio data in one or more spectral bands; or other quantitative aspects. In other examples, the VAD component 220 may be a trained classifier configured to distinguish speech and/or particular sounds from background noise. The classifier may be implemented by techniques such as linear classifiers, support vector machines, and decision trees. In still other examples, Hidden Markov Model (HMM) or Gaussian Mixture Model (GMM) techniques may be applied to compare the first audio data to one or more acoustic models in speech storage, which acoustic models may include models corresponding to speech, noise (e.g., environmental noise or background noise), or silence. Still other techniques may be used to determine whether speech and/or particular sounds are present in the first audio data.

In various embodiments, the VAD component 220 consumes less power than the wake trigger-detection component, which begins processing audio data (and hence consuming power) only when the VAD component determines that the audio data likely represents speech and/or particular sounds. In other embodiments, the wake trigger-detection component 222 processes all received audio data, and the VAD component 220 is not present or not used.

If the VAD component 220 determines the audio data includes speech and/or particular sounds, the wake trigger-detection component 222 may process the audio data to determine if a wake trigger is likely represented therein. In other embodiments, the user device 110 does not include the VAD component 220, and the wake trigger detection component 222 continually processes the audio data. The wake trigger-detection component may be used to determine a first time at which the wake trigger first appears in the audio data—a "begin point"—and a second time at which the wake trigger ceases to appear in the audio data—an "end point." Following detection of the wake trigger, the user device 110 may send the audio data 211, corresponding to audio occurring prior to the representation of the wake trigger, audio corresponding to the representation of the wake trigger, and/or audio occurring after the representation of the wake trigger to the remote system 120, with indication of detection of the wake trigger, the begin point, and/or the end point.

Though FIG. 2 illustrates certain components disposed on the remote system 120, the present disclosure is not limited thereto, and some or all of the components illustrated as disposed on the remote system 120 may instead or in addition be disposed on the user device 110. For example, the wake trigger-detection component 224, the ASR component 250, the NLU component 260, and/or the TTS component 280 may be disposed on the user device 110.

The wake trigger-detection component 222 may process the audio data using trained models to detect a wake trigger. The trained models may be CNNs, RNNs, acoustic models, hidden Markov models (HMMs), and/or classifiers. One approach for wake trigger detection that may be used, in particular, for wakeword triggers, applies general large vocabulary continuous speech recognition (LVCSR) systems to decode the audio signals, with wake trigger searching conducted in the resulting lattices or confusion networks. Another approach for wake trigger spotting builds HMMs for each key wake trigger word and non-wake trigger speech signals respectively. The non-wake trigger speech includes other spoken words, background noise, etc. There can be one or more HMMs built to model the non-wake trigger speech characteristics, which are named filler models. Viterbi decoding may be used to search the best path in the decoding graph, and the decoding output is further processed to make the decision on wake trigger presence. This approach can be extended to include discriminative information by incorporating a hybrid DNN-HMM decoding framework. In another example, the wake trigger-detection component 222 may use convolutional neural network (CNN)/recursive neural network (RNN) structures directly, without using a HMM. The wake trigger-detection component 222 may estimate the posteriors of wake triggers with context information, either by stacking frames within a context window for a DNN, or using a RNN. Follow-on posterior threshold tuning or smoothing may be applied for decision making. Other techniques for wake trigger detection may also be used.

After wake trigger detection and upon receipt by the remote system 120, the audio data 211 may be sent to an orchestrator component 230. The orchestrator component 230 may include memory and logic that enables the orchestrator component 230 to transmit various pieces and forms of data to various components of the system. In particular, the orchestrator component 230 may send the audio data to the speech command verification component 224, which may determine if the audio data includes a representation of a speech command. As described in greater detail herein with reference to FIGS. 3, 4A, and 4B, the verification of the speech command may include processing portions of audio data occurring before and after a portion of audio data corresponding to the wake trigger. The verification of the speech command may instead or in addition include processing the audio data with an RNN to determine if the audio data includes a representation of the wake trigger even if the user device 110 incorrectly determines the begin and/or endpoints of the wake trigger, as described in greater detail herein with reference to FIGS. 5 and 6.

After the speech-command verification component 224 determines that the audio data includes a representation of a speech command, the orchestrator component 230 may send the audio data 211 to a speech-processing component 240. The speech processing component 240 may include different components for different languages. One or more components may be selected based on determination of one or more languages. A selected ASR component 250 of the speech processing component 240 transcribes the audio data 211 into text data representing one more hypotheses representing speech contained in the audio data 211. The ASR component 250 interprets the utterance in the audio data 211 based on a similarity between the utterance and pre-established language models. For example, the ASR component 250 may compare the audio data 211 with models for sounds (e.g., subword units, such as phonemes, etc.) and sequences of sounds to identify words that match the sequence of sounds spoken in the utterance represented in the audio data 211. The ASR component 250 sends (either directly or via the orchestrator component 230) the text data generated thereby to a corresponding selected NLU component 260 of the speech processing component 240. The text data output by the ASR component 250 may include a top scoring hypothesis or may include an N-best list including multiple hypotheses. An N-best list may additionally include a score associated with each hypothesis represented therein. Each score may indicate a confidence of ASR processing performed to generate the hypothesis with which it is associated.

The NLU component 260 may attempt, based on the selected language, to make a semantic interpretation of the phrases or statements represented in the text data input thereto. That is, the NLU component 260 determines one or more meanings associated with the phrases or statements represented in the text data based on individual words represented in the text data. The NLU component 260 may determine an intent (e.g., a system action that a user desires the system to perform) representative of text data as well as pertinent pieces of information in the text data that allow a device (e.g., the user device 110, the remote system 120, etc.) to execute the intent. For example, if the text data corresponds to "play Africa by Toto," the NLU component 260 may determine that a user intended the user device 110 to output the song Africa performed by the band Toto, which the NLU component 260 determines is represented by a <PlayMusic> intent.

The orchestrator component 230 (or another component of the remote system 120) may send NLU results data to a speechlet component 290 associated with the intent. The speechlet component 290 may determine output data based on the NLU results data. For example, if the NLU results data includes intent data corresponding to <PlayMusic> and tagged text corresponding to <Artist: Toto>, the orchestrator 230 (or other component of the remote system 120) may send the NLU results data to a music speechlet component, which determines Toto music audio data for output by the system and/or associated text data responsive to the command.

A "speechlet" may be software running on the remote system 120 that is akin to an application. That is, a speechlet may enable the remote system 120 to execute specific functionality in order to provide data or produce some other output requested by the user 10. The remote system 120 may be configured with more than one speechlet. For example, a weather speechlet may enable the remote system 120 to provide weather information, a ride-sharing speechlet may enable the remote system 120 to book a trip with respect to a taxi or ride sharing service, and a food-order speechlet may enable the remote system 120 to order a pizza with respect to a restaurant's online ordering system.

In some instances, the speechlet 290 may determine output text data responsive to received NLU results data. The remote system 120 may include a text-to-speech (TTS) component 280 that generates output audio data from speechlet provided output text data. The TTS component 280 may use different synthesis techniques. In one method of synthesis, called unit selection, the TTS component 280 analyzes text data against a database of recorded speech. The TTS component 280 selects units of recorded speech matching the text data and concatenates the units together to form output audio data. In another method of synthesis called parametric synthesis, the TTS component 280 varies parameters such as frequency, volume, and noise to create output audio data including an artificial speech waveform. Parametric synthesis uses a computerized voice generator, sometimes called a vocoder. In another method of speech synthesis, a trained model called a sequence-to-sequence model directly generates output audio data based on the input text data.

The remote system 120 may include a user-recognition component 295. The user-recognition component 295 may receive the audio data 211 and/or text data output by the ASR component 250. The user-recognition component 295 may determine scores indicating whether the speech represented in the audio data 211 originated from a particular user. For example, a first score may indicate a likelihood that the speech originated from a first user and a second score may indicate a likelihood that the speech originated from a second user. The user-recognition component 295 may also determine an overall confidence regarding the accuracy of user recognition operations. The user-recognition component 295 may perform user recognition by comparing audio characteristics in the audio data 211 to stored audio characteristics of users. The user-recognition component 295 may also perform user recognition by comparing biometric data (e.g., fingerprint data, iris data, etc.) received by the system in correlation with the audio 15 to stored biometric data of users. The user-recognition component 295 may further perform user recognition by comparing image data (e.g., including a representation of at least a feature of a user) received by the system in correlation with the audio 15 with stored image data (e.g., including representations of features of users). The user-recognition component 295 may perform additional user recognition processes. Output of the user-recognition component 295 may be used to inform NLU processing as well as processing performed by speechlets 290.

The remote system 120 may include a user-profile storage 270. The user profile storage 270 may include a variety of information related to individual users 10 and/or groups of users 10 that interact with the remote system 120. The user-profile storage 270 may include one or more user profiles. Each user profile may be associated with a different user ID. A user profile may be an umbrella profile specific to one or a group of users. That is, a user profile may encompass two or more individual user profiles, each associated with a respective user ID. For example, a user profile may be a household profile that encompasses user profiles associated with multiple users of a single household. A user profile may include preferences shared by all the user profiles encompassed thereby. Each user profile encompassed under a single user profile may include preferences specific to the user associated therewith. That is, each user profile may include preferences unique from one or more other user profiles encompassed by the same user profile. A user profile may be a stand-alone profile or may be encompassed under another user profile. As illustrated, the user profile storage 270 is implemented as part of the remote system 120. The user profile storage 270 may, however, may be disposed in a different system in communication with the remote system 120, for example over the network 199. User-profile data may be used to inform NLU processing as well as processing performed by a speechlet 290.

The user profile storage 270 may further include data regarding individual user profiles. Each user profile may include information indicating various devices, output capabilities of each of the various devices, and/or a location of each of the various devices. The device-profile data represents a profile specific to a device. For example, device profile data may represent various user profiles that are associated with the device, speech processing that was performed with respect to audio data received from the device, instances when the device detected a wake trigger, etc. In contrast, user-profile data represents a profile specific to a user.

Figure 3:
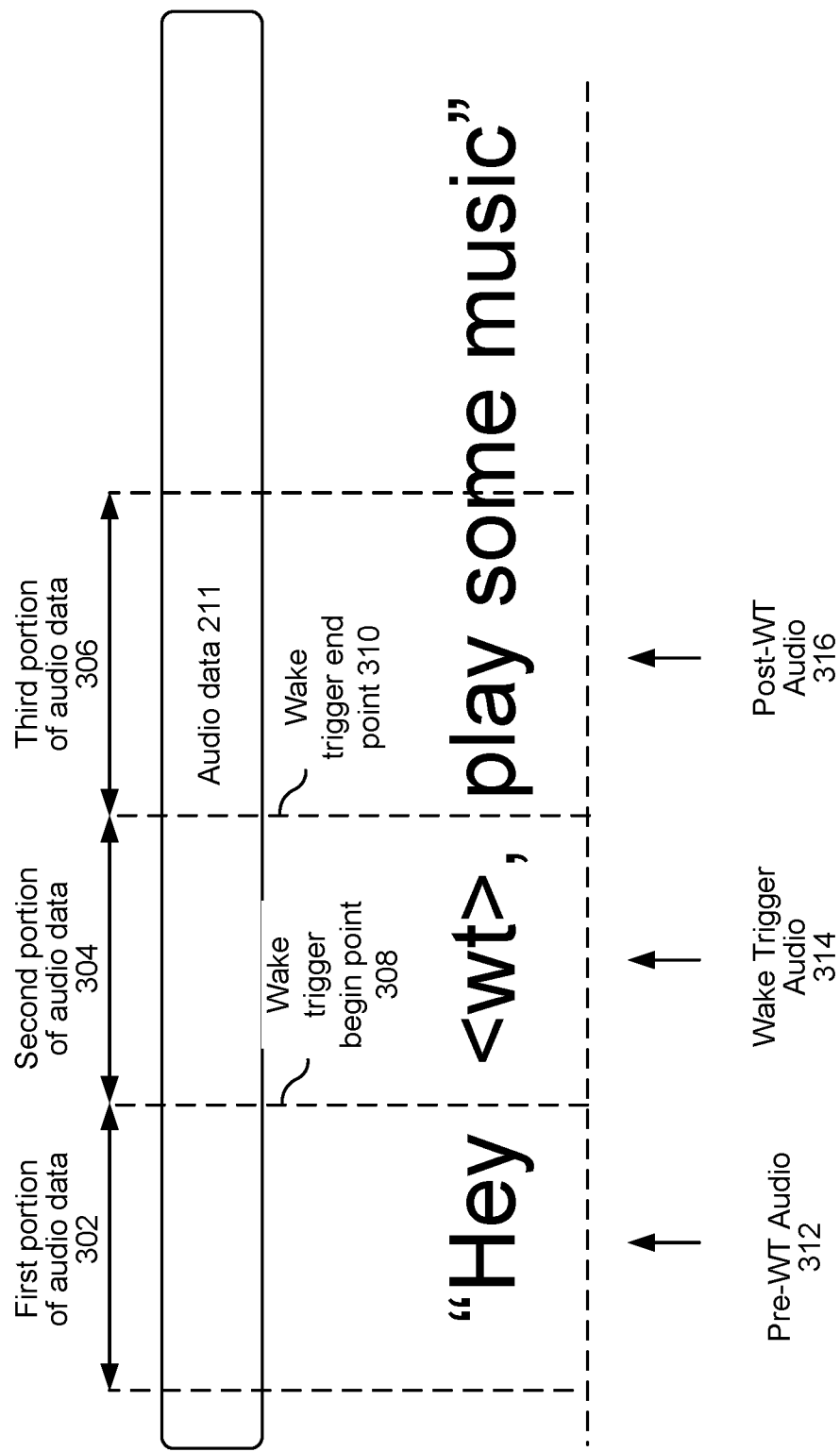
FIG. 3 illustrates a first speech command in accordance with embodiments of the present disclosure.

FIG. 3 illustrates audio data 211 corresponding to a first speech command in accordance with embodiments of the present disclosure. The audio data 211 may include a first portion 302, a second portion 304, and a third portion 306. The second portion 304 may be defined as beginning at a wake trigger begin point 308 and ending at a wake trigger end point 310. As described herein, the begin and end points 308, 310 may be determined by the wake trigger detection component 222 of the user device 110. Instead or in addition, the begin and end points 308, 310 may be determined by a second wake trigger detection component 222 of the remote system 120 and/or by the speech command verification component 224 itself. Any method of determining the begin and end points 308, 310 is within the scope of the present disclosure. The second portion of the audio data 304 may be referred to herein as wake trigger audio data 314.

The first portion 302 of the audio data 211, which may be referred to herein as pre-wake trigger audio data 312, may be have a fixed duration, for example 0.5 seconds, and may have its end point defined by the wake trigger begin point 308. The begin point of the first portion 302 may precede the wake trigger begin point 308 by the fixed duration. Similarly, the third portion 306 of the audio data 211, which may be referred to herein as post-wake trigger audio data 316, may have its begin point defined by the wake trigger end point 310. The end point of the third portion 306 may follow the wake trigger end point 310 by a fixed duration, which may be the same as or different from the fixed duration of the pre-wake trigger audio data 312 (e.g., 0.5 seconds).

The pre-wake trigger audio data 312 may include a representation of an utterance of (or other sound caused by) the user 10, such as "Hey," that precedes the representation of the wake trigger. The pre-wake trigger audio data 312 may instead include a representation of an utterance of (and/or other sound caused by) the user 10 that is unrelated to a speech command. The pre-wake trigger audio data 312 may thus provide an indication that the audio data 211 includes a representation of a speech command or an indication that the audio data 211 does not include a representation of a speech command. For example, if the pre-wake trigger audio data 312 includes some or all of a representation of the phrase, "My favorite wakeword is," the pre-wake trigger audio data 312 may provide an indication that the audio data 211 does not include a representation of a speech command.

As described herein, the processing components may process the pre-wake trigger audio data 312, the wake trigger audio 314, and/or the post-wake trigger audio 316. In other embodiments, the processing components may process preprocessed versions of the pre-wake trigger audio data 312, the wake trigger audio 314, and/or the post-wake trigger audio 316, which may include frequency data, spectrogram data, and/or LFBE data. Processing of any representation of the audio data 211 is within the scope of the present disclosure.

Figure 7A:
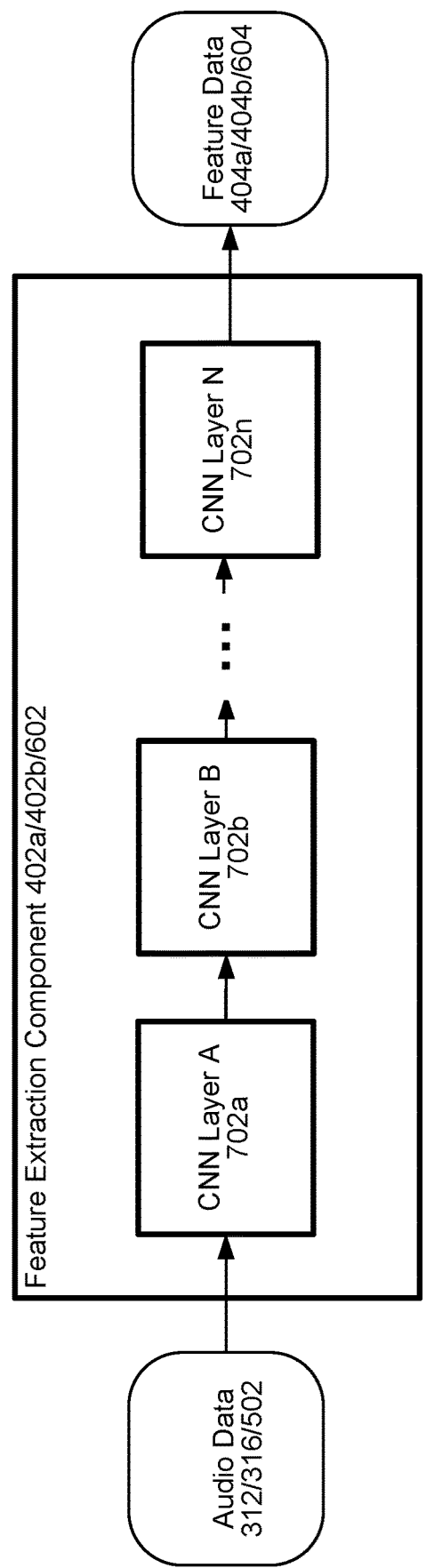
FIGS. 7A, 7B, 7C and 7D illustrate further components for verification of a speech command in accordance with embodiments of the present disclosure.
Figure 7B:
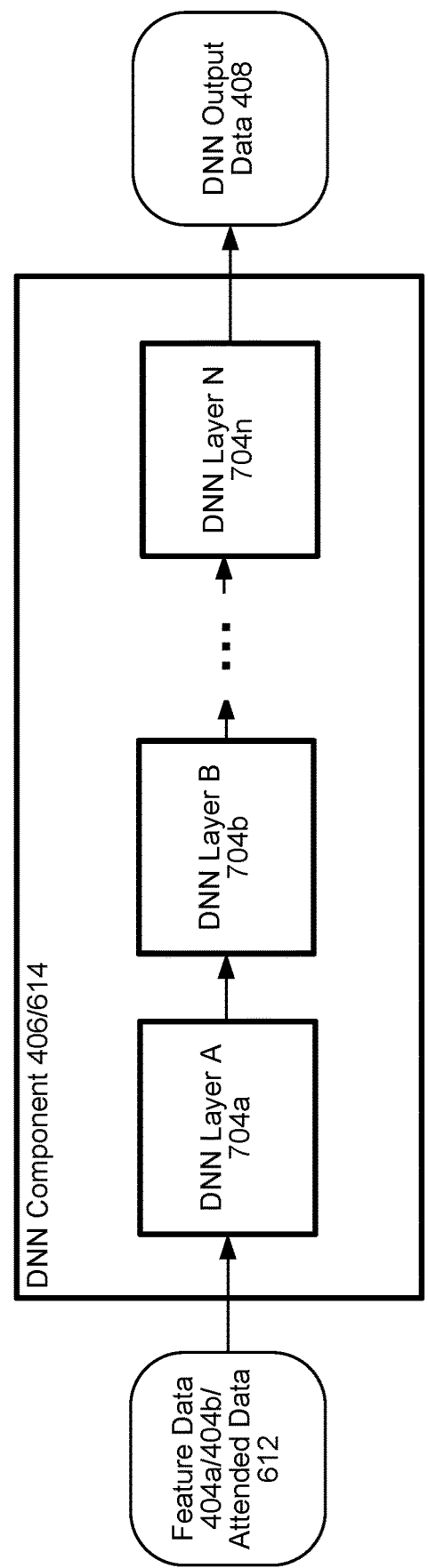

FIGS. 4A and 4B illustrate speech command verification components 224a, 224b for verification that a speech command is system directed in accordance with embodiments of the present disclosure. Referring first to FIG. 4A, the speech command verification component 224a includes a first feature-extraction component 402a processes the pre-wake trigger audio data 312 to determine first feature data 404a and a second feature-extraction component 402b processes the post-wake trigger audio data 316 to determine second feature data 404b. The first and second feature-extraction components 402a, 402b may include one or more CNN layers (and/or other feed-forward layers), as shown in FIG. 7A. A classifier 405, which may include a DNN component 406 and/or a prediction layer 410, may then process the first feature data 404a and the second feature data 404b to determine DNN output data 408, and the prediction layer 410 may process the DNN output data 408 to determine a speech-command verification determination 412, which may include an indication as to whether the audio data 211 includes a representation of the speech command. The DNN component 406 may include one or more DNN layers, and the prediction layer 410 may include one or more classification layers. Any type of classifier 405 is, however, within the scope of the present disclosure. The indication 412 may be, for example a first value (e.g., "0") indicating that the audio data 211 does not include the representation and a second value (e.g., "1") indicating that the audio data 211 includes the representation. The indication 412 may be a range of values, for example values ranging between 0.0 and 1.0, indicating a likelihood that the audio data 211 includes the representation. The remote system 120 may determine that the audio data 211 includes the representation if the value of the indication 412 is greater than a threshold value (e.g., 0.8). The values indicating the likelihood may be referred to as a posterior.

Because neither the first feature-extraction component 402a nor the second feature-extraction component 402b processes the wake trigger audio data 314, the speech command verification component 224a may be agnostic to a particular wake trigger used by the user 10 to wake the user device 110. The user 10 may, for example, train the wake trigger detection component 222 to determine when audio data includes a representation of a user-specific wake trigger.

In some embodiments, the pre-wake trigger audio data 312 and the post-wake trigger audio data 316 correspond to 48 frames of audio data and 64 frequency bins (e.g., they have dimensions of 48×64). The first feature-extraction component 402a and the second feature-extraction component 402b may each include five CNN layers. A first CNN layer may process the input data 312, 316 using 96 convolutional operations, each performing a 7×5 convolution operation, and a 2×3 max-pooling layer, thereby determining first-layer output data having a dimension of 21×20×96. A second CNN layer may process the first-layer output data using 128 convolutional operations, each performing a 5×3 convolution operation using a 2×1 stride, and a 1×2 max-pooling layer, thereby determining second-layer output data having a dimension of 9×9×128. A third CNN layer may process the second-layer output data using 128 convolutional operations, each performing a 3×3 convolution operation, thereby determining third-layer output data having a dimension of 7×7×128. A fourth CNN layer may process the third-layer output data using 160 convolutional operations, each performing a 2×3 convolution operation, thereby determining fourth-layer output data having a dimension of 6×5×160. A fifth CNN layer may process the fourth-layer output data using 160 convolutional operations, each performing a 2×3 convolution operation, thereby determining the first/second feature data 404a, 404b having dimensions of 5×3×160.

A flatten/merge layer may process the first/second feature data 404a, 404b to determine DNN input data having a dimension of 4800. The DNN component 406 may include three DNN layers, each having 500 nodes; the dimension of the output 408 of the DNN component may thus be 500, which may be processed by the prediction layer 410 to determine the speech command verification determination 412. Any type and/or number of layers for the first feature-extraction component 402a, the second feature-extraction component 402b, and the DNN component 406 is, however, within the scope of the present invention. Further, while the first feature-extraction component 402a and the second feature-extraction component 402b may include similar or the same layers, the values corresponding to the layers (e.g., node weights, offsets, and/or other values) may be different as determined during training.

FIG. 4B illustrates a speech command verification component 224b configured for training using training audio data 312, 316. The first feature-extraction component 402a, the second feature-extraction component 402b, and the classifier 405 of the speech command verification component 224b may have values assigned during training and then may be used in the speech command verification component 224b of FIG. 4A.

The speech command verification component 224b may include a gradient reversal component 414 that processes an output 408 of the DNN component 406 (which may be the same or different output 408 used to determine the speech command verification determination 412) to determine reversal output data 416, which may in turn be processed by an adversarial prediction layer 418 to determine an adversarial verification determination 420. The gradient reversal component 414 may not change the output of the DNN component 406 during forward-pass evaluation of the training data 312, 316 but may apply a negative scaling factor λ (e.g., −1) to one or more outputs of the DNN component 406 during back-propagation.

Training the first feature-extraction component 402a, the second feature-extraction component 402b, and the classifier 405 using the gradient reversal component 414 may ensure that the speech command verification component 224a is agnostic to a particular wake trigger. In some embodiments, for example, some or all of the representation of the wake trigger may appear in the pre-wake trigger audio data 312 and/or the post-wake trigger audio data 316. In other embodiments, a particular word or phrase may appear in multiple items of audio training data 312, 316 (such as "Hey," as shown in FIG. 3). Use of the gradient reversal component 414 prevents the first feature-extraction component 402a, the second feature-extraction component 402b, and the DNN component 406 from over-training on the representation of the wake trigger and/or other words, thus ensuring that the speech command verification component 224a is agnostic to a particular wakeword. In some embodiments, the training data may include, in addition to the audio training data 312, 316, an indication of the wakeword; the adversarial prediction layer 418 may process the indication to identify the wakeword in the audio training data 312, 316.

Training of the speech command verification component 224b may thus be performed in accordance with an objective function E(θ, $\gamma_y$, $\gamma_w$), as defined below in Equation (1).

$$E(\theta, \gamma_y, \gamma_w) = \sum_{i=1}^{n} [L(\gamma_y^T f(x_i, \theta), y_i - \lambda L(\gamma_w^T f(x_i, \theta) w_i)] \quad (1)$$

In the above Equation (1), θ denotes the set of parameters (e.g., node weights, offsets, and other values) for the first feature-extraction component 402a, the second feature-extraction component 402b, and the DNN component 406. The term f(x,θ) denotes the DNN output data 408 (e.g., the overall embedding of the first feature-extraction component 402a, the second feature-extraction component 402b, and the DNN component 406). The term $\gamma_y$ denotes the set of weights in the prediction layer 410 (used for, e.g., predicting whether the audio data 211 includes a speech command), and the term $\gamma_w$ denotes the set of weights in the adversarial prediction layer 418 (used for, e.g., predicting whether the wake trigger was detected correctly or incorrectly by the user device 110). L denotes a loss function (e.g., a cross-entropy loss function), and λ denotes the adversarial weight. The term $x_i$ denotes an $i^{th}$ sample of the input training data 312, 314, the term $y_i$ denotes whether $i^{th}$ sample of the input training data 312, 314, includes a representation of a speech command, and the term $w_i$ denotes the wake trigger corresponding to the an $i^{th}$ sample of the input training data 312, 314. Training the speech command verification component may include determining a saddle point at which the values of θ and $\gamma_y$ minimize the output of the Equation (1) and at which the value of $\gamma_w$ maximizes the output of the Equation (1). This training may further include processing the input data 312, 314 across of range of values of λ and selecting the values corresponding to highest correspondence between the speech command verification determination and target training data.

FIG. 5 illustrates audio data 211 representing a second speech command in accordance with embodiments of the present disclosure. In some embodiments, as illustrated, a user device 110 may incorrectly determine a wake trigger begin point 504 (and/or, in other non-illustrated embodiments, a wake trigger end point 506) and send, to the remote device 120, a begin point 505 that differs in time from that of the wake trigger begin point 504. In these embodiments, either of the pre-wake trigger audio data 512 and/or post-wake trigger audio data 516 may include a representation of at least a portion of the wake trigger. Correspondingly, the wake trigger audio data 514 may include only a portion of a representation of the wake trigger. A wakeword verification component that processes only the wake trigger audio data 514 may thus incorrectly determine that a representation of the wake trigger is or is not preset in the audio data. Embodiments of the present disclosure thus include components that verify that the audio data 211 includes a representation of a speech command (by, for example, verifying that the audio data includes the representation of the wakeword) by processing a portion 502 of the audio data that includes at least a portion of the pre-wake trigger audio data 512, at least a portion of the wake trigger audio data 514, and at least a portion of the post-wake trigger audio data 516, as shown below with reference to FIG. 6.

Figure 6:
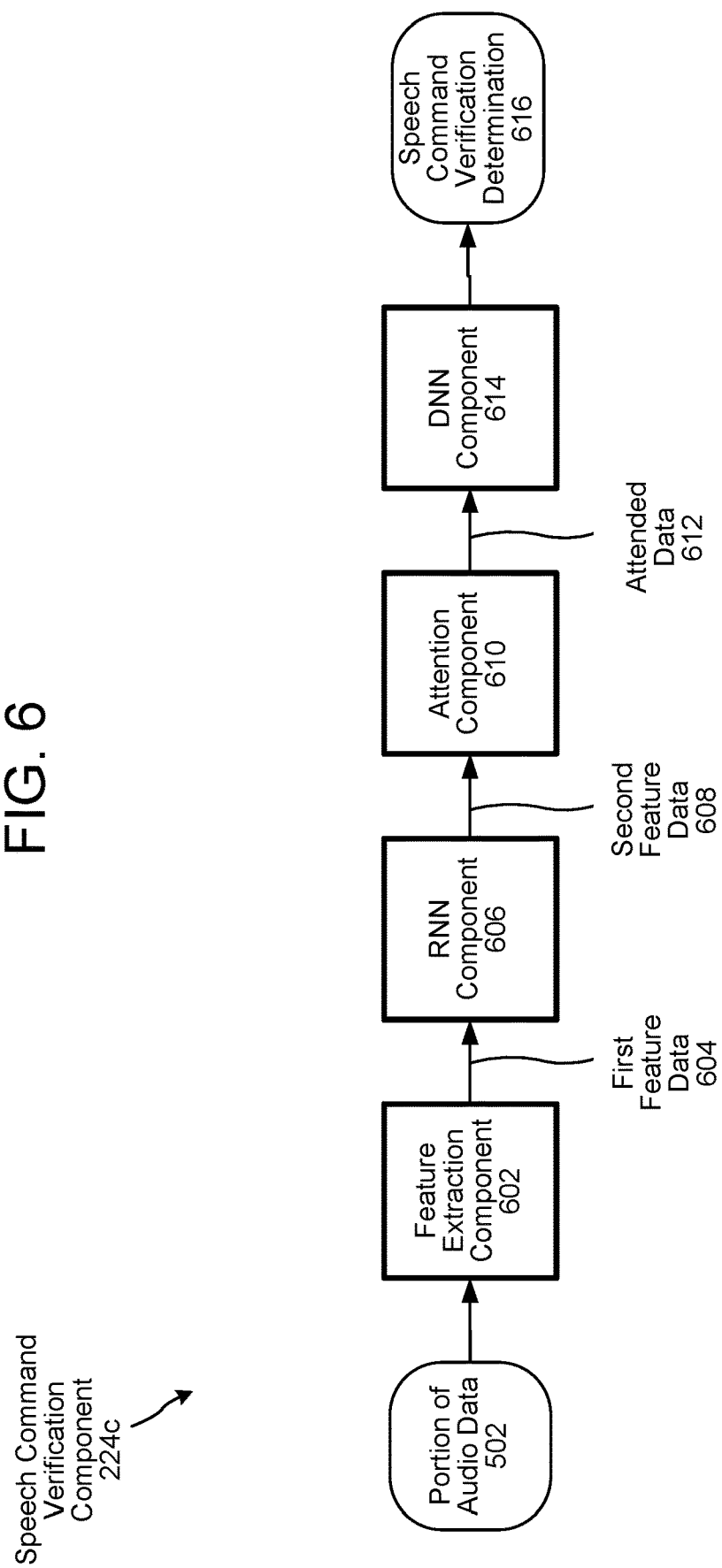
FIG. 6 illustrates components for verification of a speech command in accordance with embodiments of the present disclosure.

FIG. 6 illustrates a speech-command verification component 224c in accordance with embodiments of the present disclosure. A feature extraction component 602 may process the portion of the audio data 502 (which, as described above, may include frequency data, spectrogram data, and/or LFBE data corresponding to the audio data 211) to determine first feature data 604. The first feature data 604 may correspond to features of a duration of time of the audio data 211 less than that of the portion of the audio data 502. An RNN component may process the first feature data 604 to determine second feature data 608; the second feature data 608 may correspond to features of a duration of time of the portion 502 of the audio data (e.g., the second feature data 608 includes features corresponding to at least a portion of the pre-wake trigger audio data 512, at least a portion of the wake trigger audio data 514, and at least a portion of the post-wake trigger audio data 516. An attention component 610 may process the second feature data 608 to determine attended data 612; the attended data 612 may include features corresponding to the wake trigger and may omit features corresponding to the pre-wake trigger audio data 512 and the post-wake trigger audio data 516. A DNN component 614 may then process the attended data 612 to determine a speech command verification determination 616, which may indicate whether the wake trigger is present in the portion of the audio data 502.

The feature extraction component 602 may include one or more CNN layers. A first CNN layer may process the input data 502 using 96 convolutional operations, each performing a 9×5 convolution operation, thereby determining first-layer output data. A second CNN layer may process the first-layer output using 128 convolutional operations, each performing a 7×3 convolution operation, thereby determining second-layer output data. A third CNN layer may process the second-layer output data using 128 convolutional operations, each performing a 4×3 convolution operation, thereby determining the first feature data 604. Any number and type of CNN (or other) layers is, however, within the scope of the present disclosure.

The RNN component may include 128 LSTM cells in a single layer that process the first feature data 604 to determine the second feature data 608; any number and type of RNN cells is, however, within the scope of the present disclosure. The attention component 610 may include a number of linear layers for linearly transforming the second feature data 608 and a number of computational layers, such as matrix multiplication layers, for performing computational operations on the outputs of the linear layers. Further details of the attention component 610 are discussed below with reference to FIG. 7D. The DNN component 614 may include a DNN layer consisting of 500 DNN cells, but the present disclosure is not limited to any type or number of DNN layers. The DNN component 614 may determine the speech command verification determination 616; in some embodiments, a prediction layer (similar to the prediction layer 410 of FIG. 4A) processes the output of the DNN component 614 to determine the speech command verification determination 616.

Figure 7C:
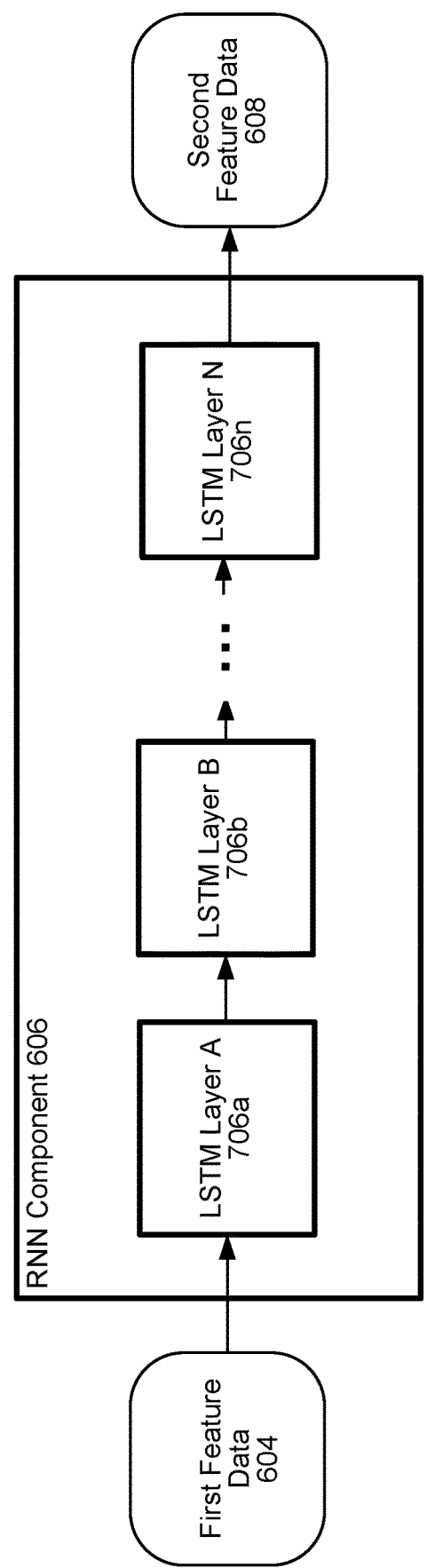

FIGS. 7A, 7B, 7C and 7D illustrate further components for verification of a speech command in accordance with embodiments of the present disclosure. Referring first to FIG. 7A, the feature extraction component 402a/402b/602 may include any number and type of feed-forward layers, such as CNN layers 702a, 702b, . . . 702n, to process input audio data 312, 316, 502 to determine output feature data 404a, 404b, 604. The present disclosure is not limited to any number or type of feed-forward layers; different types of layers may be used in the feature extraction component 402a/402b/602, and the layers may have different numbers of nodes and connectivity. Similarly, referring to FIG. 7B, the DNN component 406, 614 may include any number of DNN layers 704 (and/or other feed-forward layers), such as DNN layers 704a, 704b, . . . 704n to process input feature data 404a, 404b, 612 to determine DNN output data. The present disclosure is not limited to any number or type of DNN layers 704. Referring to FIG. 7C, the RNN component 606 may include any number of RNN layers, such as LSTM layers 706a, 706b, 706n to process first feature data 604 to determine second feature data 608. The present disclosure is not limited to any number or type of RNN layers.

Figure 7D:
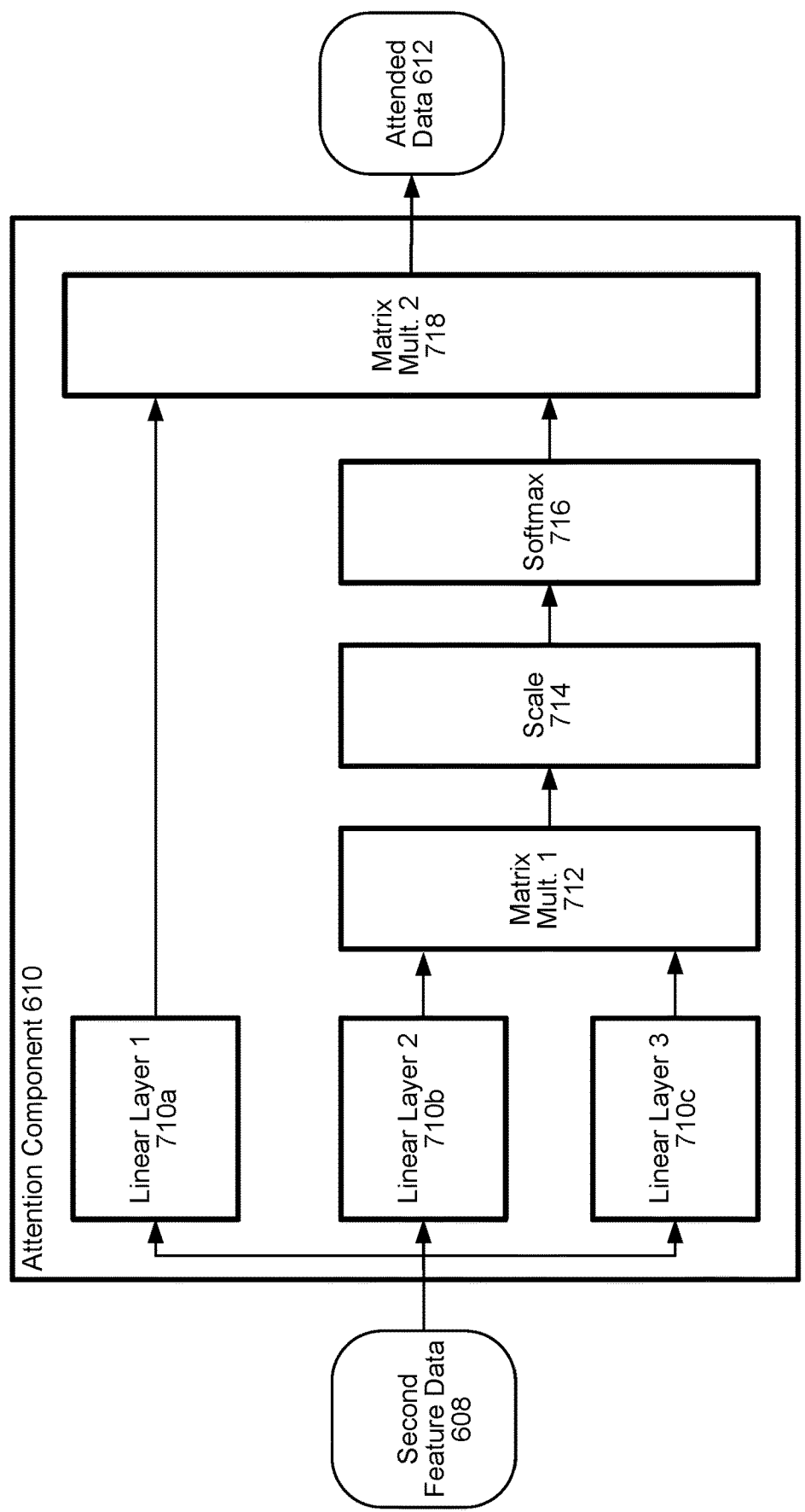

Referring to FIG. 7D, the attention component 610 may include a first linear layer 1 710a, a second linear layer 2 710b, and a third linear layer 3 710c. Each linear layer 710a, 710b, 710c may include one or more partially or fully connected nodes that apply a linear transform to the second feature data 608, such as modifying values of the second feature data 608 in accordance with weights and/or offsets. A first matrix-multiplication component 712 may multiply the outputs of the second and third linear layers 710b, 710c. A scale component 714 may apply a scaling factor to the output of the first matrix-multiplication component 712, and a softmax component 716 may perform a softmax function on the output of the scale component 714. Finally, a second matrix-multiplication component 718 may multiply the output of the softmax component 716 with the output of the first linear layer 710a to determine the attended data 612. Equation (2), below, describes the determination of the attended data 612.

$$\text{attended data} = \mathit{softmax}\left(\frac{\text{out}_{710b}\text{out}_{710c}^{T}}{\sqrt{d}}\right)\text{out}_{710c} \quad (2)$$

In the above Equation (2), T denotes a matrix transform operation, and d denotes the dimension of the outputs of the linear layers 710a, 710b, 710c (which may all be the same).

As described herein, neural networks may be used to perform various processing as described herein. The neural network may include nodes organized as an input layer, a hidden layer, and an output layer. The input layer may include m nodes, the hidden layer n nodes, and the output layer o nodes, where m, n, and o may be any numbers and may represent the same or different numbers of nodes for each layer. Nodes of the input layer may receive inputs, and nodes of the output layer may produce outputs. Each node of the hidden layer may be connected to one or more nodes in the input layer and one or more nodes in the output layer. Other neural network may include multiple middle layers; in these cases, each node in a hidden layer may connect to some or all nodes in neighboring hidden (or input/output) layers. Each connection from one node to another node in a neighboring layer may be associated with a weight or score. A neural network may output one or more outputs, a weighted set of possible outputs, or any combination thereof.

In one aspect, the neural network may be constructed with recurrent connections such that the output of the hidden layer of the network feeds back into the hidden layer again for the next set of inputs. Each node of the input layer connects to each node of the hidden layer. Each node of the hidden layer connects to each node of the output layer. The output of the hidden layer is fed back into the hidden layer for processing of the next set of inputs. A neural network incorporating recurrent connections may be referred to as a recurrent neural network (RNN). Nodes of an RNN may be, for example, long short-term memory (LSTM) nodes or gated recurrent unit (GRU) nodes.

Processing by a neural network is determined by the learned weights on each node input and the structure of the network. Given a particular input, the neural network determines the output one layer at a time until the output layer of the entire network is calculated. Connection weights may be initially learned by the neural network during training, where given inputs are associated with known outputs. In a set of training data, a variety of training examples are fed into the network. Each example typically sets the weights of the correct connections from input to output to 1 and gives all connections a weight of 0. As examples in the training data are processed by the neural network, an input may be sent to the network and compared with the associated output to determine how the network performance compares to the target performance. Using a training technique, such as back propagation, the weights of the neural network may be updated to reduce errors made by the neural network when processing the training data. In some circumstances, the neural network may be trained with a lattice to improve speech recognition when the entire lattice is processed.

Processing by a neural network may be determined by the learned weights on each node input and the structure of the network. Given a particular input, the neural network determines the output one layer at a time until the output layer of the entire network is calculated. Connection weights may be initially learned by the neural network during training, where given inputs are associated with known outputs. In a set of training data, a variety of training examples are fed into the network. Each example typically sets the weights of the correct connections from input to output to 1 and gives all connections a weight of 0. As examples in the training data are processed by the neural network, an input may be sent to the network and compared with the associated output to determine how the network performance compares to the target performance. Using a training technique, such as back propagation, the weights of the neural network may be updated to reduce errors made by the neural network when processing the training data. In some circumstances, the neural network may be trained with an entire lattice to improve speech recognition when the entire lattice is processed.

FIG. 8 illustrates components of the user device 110 in accordance with the present disclosure. In various embodiments, the user device 110 receives input audio data 802 that potentially represents an utterance or other sound caused by the user 10 and which may also represent a wake trigger. The input audio data 802 may be digital data that represents a time-domain or frequency-domain audio signal. In other embodiments, the input audio data 802 is data that has been processed using, for example, an acoustic model, and represents acoustic units and/or audio features of the digital data.

A VAD component 220 may receive and process the input audio data 802 using the techniques described above. In accordance with those techniques, the VAD component 220 may determine that the input audio data 802 likely includes a representation of speech. If this determination is made, the VAD component 220 may send corresponding speech-related audio data, referred to herein as speech audio data 804, to a wake trigger-detection component 222. As noted above, however, in some embodiments, the user device 110 does not include and/or does not use the VAD component 220; in these embodiments, the wake trigger-detection component 222 processes the input audio data 802 continually and not only when the VAD component 220 determines that the input audio data 802 likely includes a representation of speech and/or of a particular sound. As discussed in greater detail above, the wake trigger-detection component 222 outputs a wake trigger-detection determination 808. Based on this determination, the user device 110 may determine that the speech audio data 804 includes a representation of the wake trigger and a begin point 810 and end point 812 of the wake trigger.

The wake trigger-detection component 222 may include one or more CNN/DNN layers, which may be fully connected layers in that each node in a layer is connected to every node in a preceding or subsequent layer. The wake trigger-detection component 222 may further include one or more output layers (which may include softmax and/or sigmoid layers) that produce the determinations 808. The wake trigger-detection component 222 may include other types of layers or functions, such as a sigmoid layer or function.

The CNN may include two or more convolutional blocks and a number of layers. A bottom convolutional layer may input the audio data 802 and with a stride of (2,1) (meaning the layer may skip an output every two timestamps). The CNN then may have a max pooling layer with a stride of (2,2) resulting in a 2× time dimensionality reduction and a 2× frequency reduction. The result of the max pooling is then processed by the next two convolutional blocks/residual network blocks (e.g., cony 3×3, 64), the output of which is then processed by the next two convolutional blocks (cony 3×3, 128). An average pooling block may then be used to further reduce the dimensionality before feeding into a bi-directional gated recurrent unit (GRU) layer to produce the audio feature data. The audio feature vectors may have a time scale of 186 milliseconds, e.g., eight times the resolution of an input spectrogram. The number of units in the feature data may correspond to the number of units in the bi-directional GRU layer of the CRNN.

The aforementioned neural-network models and other models described herein may be trained and operated according to various machine-learning techniques. Such techniques may include, for example, neural networks (such as convolutional neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. For example, a SVM is a supervised learning model with associated learning algorithms that analyze data and recognize patterns in the data and may be used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply machine-learning techniques, machine learning processes themselves may first be trained. Training a machine learning component may include establishing a "ground truth" for training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques. During training, the training data may be applied to a model and the output of the model may be evaluated for its accuracy in producing the expected output specified by the training data. The model may be updated in accordance with, for example, a gradient-descent algorithm, in which one or more weights of the model are back filled.

Figure 9:
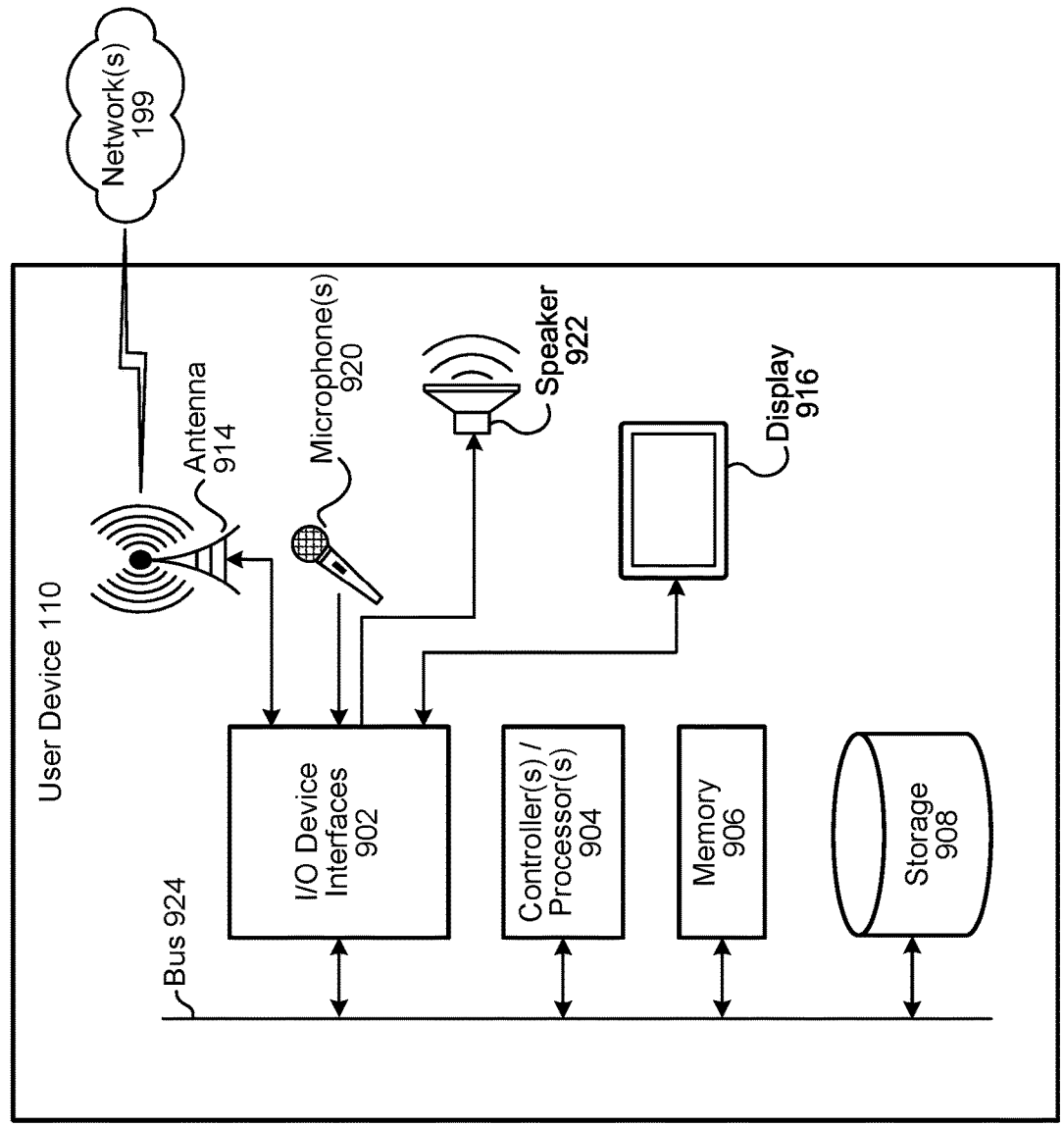
FIG. 9 illustrates components of a user device in accordance with embodiments of the present disclosure.

FIG. 9 is a block diagram conceptually illustrating example components of the user device 110. FIG. 10 is a block diagram conceptually illustrating example components of a remote system 120, which may assist with ASR processing, NLU processing, etc. Multiple servers may be included in the remote system 120, such as one or more servers for performing ASR, one or more servers for performing NLU, etc. In operation, each of these devices (or groups of devices) may include computer-readable and computer-executable instructions that reside on the respective device (110/120), as discussed further below.

The user device 110 and/or the remote system 120 may include one or more controllers/processors (904/1004), which may each include a central processing unit (CPU) for processing data and computer-readable instructions, and a memory (906/1006) for storing data and instructions of the respective device. The memories (906/1006) may individually include volatile random access memory (RAM), non-volatile read only memory (ROM), non-volatile magnetoresistive memory (MRAM), and/or other types of memory. The user device 110 and/or the remote system 120 may also include a data storage component (908/1008) for storing data and controller/processor-executable instructions. Each data storage component (908/1008) may individually include one or more non-volatile storage types such as magnetic storage, optical storage, solid-state storage, etc. The user device 110 and/or the remote system 120 may also be connected to removable or external non-volatile memory and/or storage (such as a removable memory card, memory key drive, networked storage, etc.) through respective input/output device interfaces (902/1002).

Computer instructions for operating the user device 110 and/or the remote system 120 and its various components may be executed by the respective device's controller(s)/processor(s) (904/1004), using the memory (906/1006) as temporary "working" storage at runtime. A device's computer instructions may be stored in a non-transitory manner in non-volatile memory (906/1006), storage (908/1008), or an external device(s). Alternatively, some or all of the executable instructions may be embedded in hardware or firmware on the respective device in addition to or instead of software.

The user device 110 and/or the remote system 120 may include input/output device interfaces (902/1002). A variety of components may be connected through the input/output device interfaces (902/1002), as will be discussed further below. Additionally, each device (110/120) may include an address/data bus (924/1024) for conveying data among components of the respective device. Each component within a device (110/120) may also be directly connected to other components in addition to (or instead of) being connected to other components across the bus (924/1024).

Referring to FIG. 9, the user device 110 may include input/output device interfaces 1002 that connect to a variety of components, such as a loudspeaker 922, a wired headset or a wireless headset, or other component capable of outputting audio. The user device 110 may also include an audio capture component. The audio capture component may be, for example, a microphone 920 or array of microphones, a wired headset or a wireless headset, etc. The user device 110 may additionally include a display 916 for visually presenting content and an antenna 914.

Via antenna(s) 914, the input/output device interfaces 902 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network 199, the remote system 120 may be distributed across a networked environment. The I/O device interface (1002/1002) may also include communication components that allow data to be exchanged between devices such as different physical servers in a collection of servers or other components.

The components of the user device 110 and the remote system 120 may include their own dedicated processors, memory, and/or storage. Alternatively, one or more of the components of the user device 110 and the remote system 120 may utilize the I/O interfaces (1002/1002), processor(s) (904/1004), memory (906/1006), and/or storage (908/1008) of the user device 110 and system 120, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the user device 110 and the remote system 120, as described herein, are illustrative, and may be located as a stand-alone device or may be included, in whole or in part, as a component of a larger device or system.

As illustrated in FIG. 11, multiple devices (110a, 110b, 110c, 110d, 110e, 110f, 120, 1102, 1104) may contain components of the present disclosure and the devices may be connected over a network 199. The network 199 may include a local or private network or may include a wide-area network, such as the Internet. Devices may be connected to the network 199 through either wired or wireless connections. For example, a smart loudspeaker 110a, a smart phone 110b, a refrigerator 110c, a tablet computer 110d, a desktop computer 110e, a laptop computer 110f, a smart television, and/or a TV set-top box may be connected to the network 199 through a wireless service provider, over a WiFi or cellular network connection, or the like. A microphone 1102 and a loudspeaker 1104 may further be connected to the network 199. Other devices are included as network-connected support devices, such as the remote system 120, or others. The support devices may connect to the network 199 through a wired connection or wireless connection.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
   receiving, from a user device, audio data representing speech, the audio data being sent from the user device in response to the user device determining that the speech includes a representation of a wake trigger;
   receiving, from the user device, first data representing a first time of a beginning of the representation of the wake trigger in the audio data;
   receiving, from the user device, second data representing a second time of an end of the representation of the wake trigger in the audio data;
   processing the audio data and the first data to determine a first portion of the audio data occurring before the representation;
   processing the audio data and the second data to determine a second portion of the audio data occurring after the representation;
   processing, using a first convolutional neural-network (CNN) layer, the first portion to determine first feature data representing the first portion;
   processing, using a second CNN layer, the second portion to determine second feature data representing the second portion;
   processing, using a dense neural-network (DNN) layer, the first feature data and the second feature data to determine that the audio data includes a representation of a command; and
   in response to determining that the audio data includes the representation of the command, causing processing of the audio data to determine a response to the command.

2. The computer-implemented method of claim 1, further comprising:
   processing, using a third CNN component, the audio data to determine third feature data representing the audio data;
   processing, using a recurrent neural-network (RNN) layer, the third feature data to determine fourth feature data corresponding to the first portion and the second portion;
   processing, using an attention-network layer, the fourth feature data to determine attended data corresponding to a position of the representation of the wake trigger in the audio data; and
   processing, using a second DNN layer, the attended data to determine that the audio data includes the representation of the wake trigger.

3. A computer-implemented method comprising:
   determining audio data representing speech;
   receiving, from a user device, first data corresponding to a wake trigger;
   determining a first portion of the audio data, the first portion occurring before a second portion of the audio data, the second portion indicated in the first data as corresponding to the wake trigger;
   determining a third portion of the audio data, the third portion occurring after the second portion;
   processing, using a neural network, the first portion to determine first feature data representing the first portion;
   processing, using the neural network, the third portion to determine second feature data representing the third portion;
   processing the first feature data and the second feature data to determine that the audio data is system directed; and
   in response to determining the audio data is system directed, causing processing of the audio data to determine a response to the audio data.

4. The computer-implemented method of claim 3, further comprising:
   determining, by the user device, that the second portion of the audio data includes a representation of the wake trigger;
   determining a begin point of the second portion based on the representation;
   determining an end point of the second portion based on the representation; and
   sending, in the first data, a first indication of the begin point and a second indication of the end point.

5. The computer-implemented method of claim 3, wherein:
   processing the first portion comprises processing, using a first convolutional neural-network (CNN) layer of the neural network, second audio data corresponding to the first portion;
   processing the third portion comprises processing, using a second CNN layer of the neural network, third audio data corresponding to the third portion; and
   processing the first feature data and the second feature data comprises processing, using a dense neural-network (DNN) layer of the neural network, fourth audio data corresponding to the first feature data and the second feature data.

6. The computer-implemented method of claim 3, further comprising:
   based on determining that the audio data is system directed, determining that the second portion corresponds to the wake trigger.

7. The computer-implemented method of claim 3, further comprising:
   processing third feature data to determine that second audio is system directed, wherein a fourth portion of the second audio includes a third representation of at least a portion of the wake trigger.

8. The computer-implemented method of claim 3, further comprising:
   processing, using a convolutional neural-network (CNN) component, the audio data to determine third feature data representing a third feature of the audio data;

processing, using a recurrent neural-network (RNN) component, the third feature data to determine fourth feature data corresponding to the first portion, the second portion, and the third portion; and processing the fourth feature data to determine that the audio data includes a representation of the wake trigger.

9. The computer-implemented method of claim 8, wherein processing the fourth feature data comprises:

processing, using an attention-network component, the fourth feature data to determine attended data corresponding to the representation; and processing, using a dense neural-network (DNN) component, the attended data.

10. The computer-implemented method of claim 9, wherein determining the attended data comprises:

processing, using a first linear layer, the fourth feature data to determine second data;

processing, using a second linear layer, the fourth feature data to determine third data;

processing, using a third linear layer, the fourth feature data to determine fourth data; and multiplying the second data, the third data and the fourth data.

11. The computer-implemented method of claim 8, wherein:

determining, by the user device, a begin point of the second portion based on the representation; and determining, by the user device, an end point of the second portion based on the representation, wherein determining the first portion is based on the begin point and determining the third portion is based on the end point.

12. A system comprising:

at least one processor; and at least one memory including instructions that, when executed by the at least one processor, cause the system to:

determine audio data representing speech;

receive, from a user device, first data corresponding to a wake trigger;

determine a first portion of the audio data, the first portion occurring before a second portion of the audio data, the second portion indicated in the first data as corresponding to the wake trigger;

determine a third portion of the audio data, the third portion occurring after the second portion;

process, using a neural network, the first portion to determine first feature data representing the first portion;

process, using the neural network, the third portion to determine second feature data representing the third portion;

process the first feature data and the second feature data to determine that the audio data is system directed; and in response to determining that the audio data is system directed, causing processing of the audio data to determine a response to the audio data.

13. The system of claim 12, wherein the at least one memory further includes instructions that, when executed by the at least one processor, further cause the system to:

determine, by the user device, that the second portion of the audio data includes a second representation of the wake trigger;

determine a begin point of the second portion based on the second representation;

determine an end point of the second portion based on the second representation; and send, in the first data, a first indication of the begin point and a second indication of the end point.

14. The system of claim 12, wherein the at least one memory further includes instructions that, when executed by the at least one processor, further cause the system to:

process the first portion comprises processing, using a first convolutional neural-network (CNN) layer of the neural network, second audio data corresponding to the first portion;

process the third portion comprises processing, using a second CNN layer of the neural network, third audio data corresponding to the third portion; and process the first feature data and the second feature data comprises processing, using a dense neural-network (DNN) layer of the neural network, fourth audio data corresponding to the first feature data and the second feature data.

15. The system of claim 12, wherein the at least one memory further includes instructions that, when executed by the at least one processor, further cause the system to:

based on determining that the audio data is system directed, determine that the second portion corresponds to the wake trigger.

16. The system of claim 12, wherein the at least one memory further includes instructions that, when executed by the at least one processor, further cause the system to:

process third feature data to determine that second audio is system directed, wherein a fourth portion of the second audio includes a third representation of a at least a portion of a wake trigger.

17. The system of claim 12, wherein the at least one memory further includes instructions that, when executed by the at least one processor, further cause the system to:

process, using a convolutional neural-network (CNN) component, the audio data to determine third feature data representing a third feature of the audio data;

process, using a recurrent neural-network (RNN) component, the third feature data to determine fourth feature data corresponding to the first portion, the second portion, and the third portion; and process the fourth feature data to determine that the audio data includes a representation of the wake trigger.

18. The system of claim 17, wherein the at least one memory further includes instructions that, when executed by the at least one processor, further cause the system to:

process, using an attention-network component, the fourth feature data to determine attended data corresponding to the representation; and process, using a dense neural-network (DNN) component, the attended data.

19. The system of claim 18, wherein the at least one memory further includes instructions that, when executed by the at least one processor, further cause the system to:

process, using a first linear layer, the fourth feature data to determine second data;

process, using a second linear layer, the fourth feature data to determine third data;

process, using a third linear layer, the fourth feature data to determine fourth data; and multiply the second data, the third data and the fourth data.

20. The system of claim 17, wherein the at least one memory further includes instructions that, when executed by the at least one processor, further cause the system to:

determine, by the user device, a begin point of the second portion based on the representation; and determine, by the user device, an end point of the second portion based on the representation, wherein determining the first portion is based on the begin point and determining the third portion is based on the end point.

\* \* \* \* \*